US011386532B2

(12) United States Patent
Goodall et al.

(10) Patent No.: US 11,386,532 B2
(45) Date of Patent: Jul. 12, 2022

(54) BLUE NOISE MASK FOR VIDEO SAMPLING

(71) Applicant: Facebook Technologies, LLC, Menlo Park, CA (US)

(72) Inventors: Todd Goodall, Mill Valley, CA (US); Anton S Kaplanyan, Redmond, WA (US); Anjul Patney, Kirkland, WA (US); Jamorn Sriwasansak, Redmond, WA (US); Thomas Sebastian Leimkuhler, Redmond, WA (US)

(73) Assignee: Facebook Technologies, LLC., Menlo Park, CA (US)

( * ) Notice: Subject to any disclaimer, the term of this patent is extended or adjusted under 35 U.S.C. 154(b) by 0 days.

(21) Appl. No.: 17/028,850

(22) Filed: Sep. 22, 2020

(65) Prior Publication Data

US 2022/0092744 A1 Mar. 24, 2022

(51) Int. Cl.
*G06T 5/00* (2006.01)
*G06T 9/00* (2006.01)
*G06T 1/00* (2006.01)

(52) U.S. Cl.
CPC ............ *G06T 5/004* (2013.01); *G06T 1/0064* (2013.01); *G06T 9/005* (2013.01)

(58) Field of Classification Search
CPC ........ G06T 5/004; G06T 9/005; G06T 1/0064
See application file for complete search history.

(56) References Cited

U.S. PATENT DOCUMENTS

| 2001/0038464 A1* | 11/2001 | Pettitt | G09G 3/2022 |
| | | | 345/596 |
| 2006/0233438 A1* | 10/2006 | Xu | G09G 3/2051 |
| | | | 382/162 |
| 2009/0244365 A1 | 10/2009 | Takeda et al. | |

(Continued)

FOREIGN PATENT DOCUMENTS

| CN | 106844736 A | * | 6/2017 | ............ G06T 5/003 |
| CN | 110490795 A | * | 11/2019 | ............ G06T 5/003 |
| CN | 111047529 A | * | 4/2020 | |

OTHER PUBLICATIONS

Victor Ostromoukhov, Charles Donohue, and Pierre-Marc Jodoin. 2004. Fast hierarchical importance sampling with blue noise properties. ACM Trans. Graph. 23, 3 (Aug. 2004), 488-495. DOI:https://doi.org/10.1145/1015706.1015750 (Year: 2004).*

(Continued)

*Primary Examiner* — Charles T Shedrick
(74) *Attorney, Agent, or Firm* — Baker Botts L.L.P.

(57) ABSTRACT

In one embodiment, a computing system may receive a video including a sequence of frames. The computing system may access a three-dimensional mask that specifies pixel-sampling locations, the three-dimensional mask having a first dimension and a second dimension corresponding to a spatial domain and a third dimension corresponding to a temporal domain. Blue noise property may be present in the pixel-sampling locations that are associated with each of a plurality of two-dimensional spatial slices of the three-dimensional mask in the spatial domain and the pixel- (Continued)

sampling locations that are associated with each of a plurality of one-dimensional temporal slices of the three-dimensional mask in the temporal domain. The computing system may generate a sample of the video by sampling the sequence of frames using the three-dimensional mask.

20 Claims, 14 Drawing Sheets

(56) References Cited

U.S. PATENT DOCUMENTS

| | | | |
|---|---|---|---|
| 2017/0132833 A1* | 5/2017 | Sathe | G06T 11/40 |
| 2018/0137389 A1* | 5/2018 | Mathieu | G06K 9/00718 |
| 2018/0205955 A1* | 7/2018 | Bona | H04N 19/15 |
| 2018/0260936 A1 | 9/2018 | Schroers et al. | |
| 2019/0268600 A1* | 8/2019 | Bona | H04N 19/103 |
| 2019/0355095 A1 | 11/2019 | Wei et al. | |
| 2020/0126191 A1 | 4/2020 | Munkberg et al. | |
| 2020/0193674 A1* | 6/2020 | Pharr | G06T 15/06 |
| 2021/0166396 A1 | 6/2021 | Chen et al. | |

OTHER PUBLICATIONS

Eric Heitz, Laurent Belcour. Distributing Monte Carlo Errors as a Blue Noise in Screen Space by Permuting Pixel Seeds Between Frames. Computer Graphics Forum, Wiley, 2019, 38. ffhal-02158423 (Year: 2019).*

Chen Z., et al., "Variational Blue Noise Sampling," IEEE Transactions On Visualization and Computer Graphics, vol. 18, No. 10, Oct. 2012, pp. 1784-1796.

International Search Report and Written Opinion for International Application No. PCT/US2021/050507, dated Jan. 14, 2022, 11 pages.

Yang L., et al., "A Survey of Temporal Antialiasing Techniques," Computer Graphics Forum : Journal of the European Association for Computer Graphics, vol. 39, No. 2, May 1, 2020, 15 pages.

Bertasius G., et al., "Object Detection in Video with Spatiotemporal Sampling Networks." Proceedings of the European Conference on Computer Vision (ECCV), 2018, pp. 1-16.

Wei L-Y., "Multi-Class Blue Noise Sampling," ACM Transactions on Graphics (TOG), Jul. 2010, vol. 29, No. 4, Article 79, pp. 1-8.

Yan D-M., et al., "A Survey of Blue-Noise Sampling and Its Applications," Journal of Computer Science and Technology, May 2015, vol. 30, No. 3, pp. 439-452.

* cited by examiner

BLUE NOISE MASK FOR VIDEO SAMPLING

TECHNICAL FIELD

This disclosure generally relates to systems and methods of video sampling.

BACKGROUND

Video is captured by a variety of devices. These devices are more frequently equipped with state-of-the-art cameras that produce images of high resolution. While these devices may be able to capture high resolution images, the devices may need more resources to interact with this captured content. To assist devices to be able to process and share the captured images, sampling may be used to reduce the size of the image while preserving the content of the image. This has a wide range of functions with enabling the transfer of images, processing of images, and the like.

SUMMARY OF PARTICULAR EMBODIMENTS

Disclosed herein are a variety of different ways of sampling a video. The purposes of sampling a video may be for compression, streaming, efficient rendering, etc. A computing system may access a video comprising a plurality of frames containing images. The computing system may capture the video via a camera or receive the video from another computing system. One goal of the disclosed methods is to improve the distribution of sampling locations within a sampling mask. While a blue noise mask may be used to sample an image or video, there may be a loss of blue noise properties when applying a blue noise mask to a video. The distribution of sampling locations of a two-dimensional blue noise mask or a three-dimensional blue noise mask may not yield a desired result. As such, a blue noise mask may be generated that considers the temporal domain and helps to improve upon the sampling of videos by improving the temporal consistency of while preserving the spatial quality. A Manhattan distance may be used to generate a Manhattan blue noise mask. The Manhattan distance may be used with respect to the temporal domain and a Euclidean distance may be used with respect to the spatial domain, which would result in a priority in the spatial domain over the temporal domain while still considering the temporal domain. Another goal of the disclosed methods is to efficiently compensate for motion in spatiotemporal sampling. By compensating for motion in spatiotemporal sampling, a computing system may reduce the samples needed to sample a video. In particular embodiments, a computing system may calculate an optical flow between two frames in order to transform sampling locations from the first frame to the second frame. These sampling locations transformed to the second frame reduces the need to resample parts of the second frame that may have been sufficiently captured by the first frame. Thereby, enabling the computing system to focus on the parts of the second frame where information is lacking.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured content (e.g., real-world photographs). The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may be associated with applications, products, accessories, services, or some combination thereof, that are, e.g., used to create content in an artificial reality and/or used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

Figure 1:
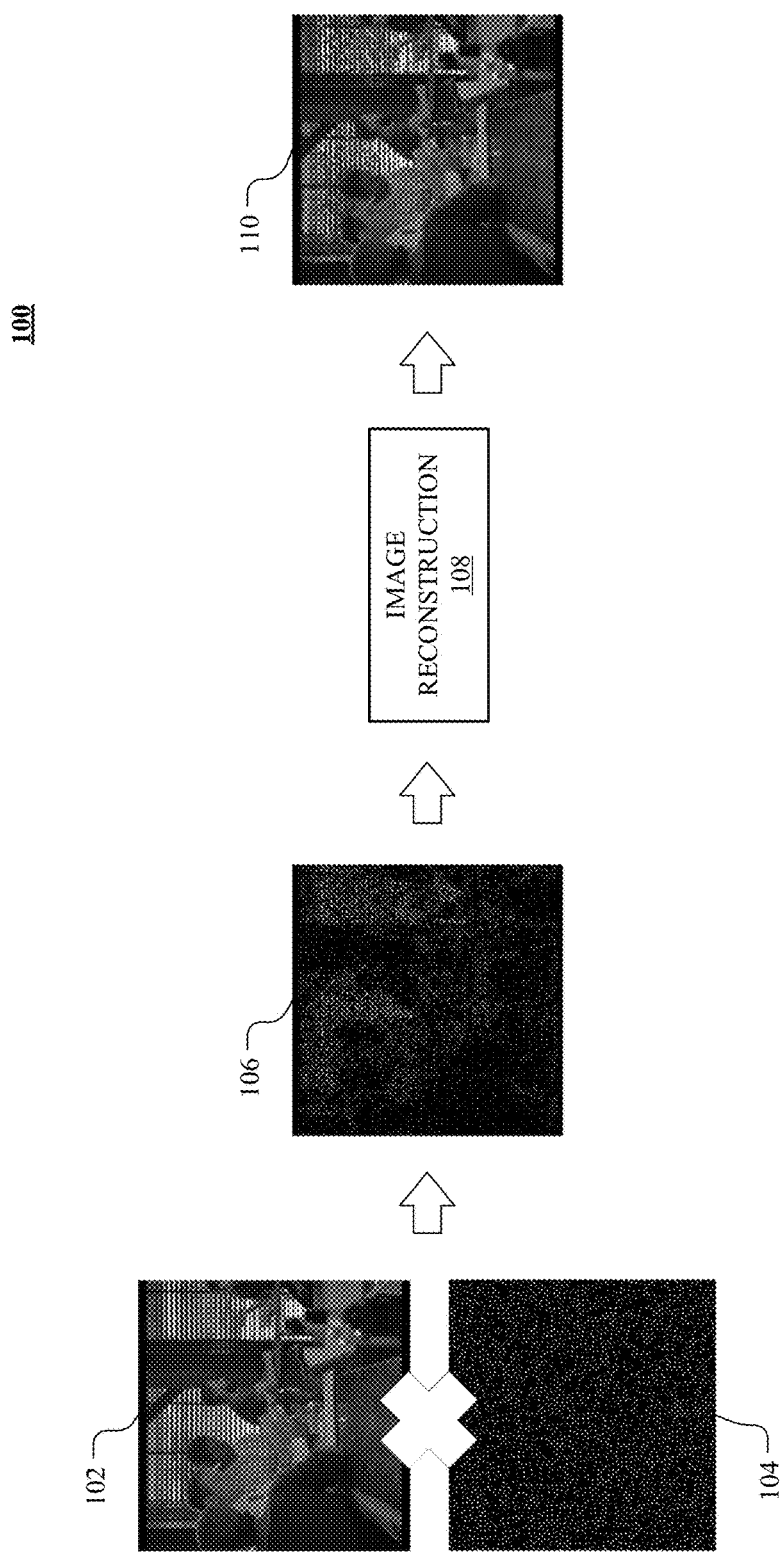
FIG. 1 illustrates an example process of reconstructing an image.

As more people adopt artificial reality systems, more people will begin to use artificial reality systems for a variety of reasons. Artificial reality may be embodied as one or more of an augmented reality, virtual reality, or mixed reality. When using artificial reality systems, there are several functions that may involve capturing images via cameras coupled to the artificial reality system and using the captured images, such as image processing and reconstructing the captured images. Although described as captured images via a camera, other images, such as synthetic images rendered by a computing system or graphics processing unit may be used. The processing capabilities of artificial reality systems may be limited, such as if the artificial reality system is embodied as a smartphone coupled to a headset. Therefore to improve upon the efficiency of the artificial reality system's image processing, sampling may be used on captured images. Additionally, a goal when sampling images may be to sample as few times as possible. While point probing pixels may be an option to sample images, point probing may be expensive. As such, other methods of efficiently sampling images may be needed. This may be especially true when a computing system performing the sampling may have a limited power source. Although the sampling of images may be described in context of an artificial reality system, the sampling described herein may be applied generally to images captured or generated by a plurality of devices.

In particular embodiments, a blue noise mask may be used for image/video sampling. In connection with generating a blue noise mask, particular embodiments may utilize one or more systems, components, elements, functions, methods, operations, or steps disclosed in U.S. patent application Ser. No. 16/689,684, filed 20 Nov. 2019, which is incorporated by reference. Currently, sampling of images may comprise picking points (e.g., pixels) or locations within an image to sample. The sampling may be used for image reconstruction. Since an image could be reconstructed from its samples, the samples could be transmitted, stored, and processed in lieu of the full image, which improves performance and reduces power consumption. Sampling may be used for video compression and transmission (e.g., a mobile device could send the samples of a video to a head-mounted display where the video would be reconstructed). In order to preserve the desired distribution of pixel information for image reconstruction, a blue noise mask may be used to pick the points to sample. A blue noise mask may specify a distribution of points to sample within an image. The blue-noise property of the pixel samples may improve the quality of the reconstructed image. The blue noise masks that are selected or generated to be used for image/video sampling may have a sample pattern that have a minimal spacing between points. Properties of a blue noise mask may include that it is isotropic and that it relegates the noise within the higher-frequency domains and reduces the noise of the low-frequency domain. While blue noise masks may provide an improved distribution of samples for image reconstruction, there may be a loss of blue noise properties when factoring in the temporal domain. That is, applying a blue noise mask to images of a video may result in a lesser-quality sampling and may lead to introductions of artifacts in the low-frequency domain.

In particular embodiments, a blue noise mask may be generated that considers the temporal domain. The blue noise mask that considers the temporal domain may improve upon the sampling of videos by improving upon the temporal consistency. The improvement in temporal consistency may be shown when the images/video are reconstructed by presenting a stable image over time. To consider the temporal domain, the sampling may factor in the temporal domain by providing an improved distribution of samples throughout time. In particular embodiments, the spatial domain of the spatiotemporal domain may be given more weight than the temporal domain. Priority may be given to the two-dimensional spatial domain of the blue noise mask applied to individual images across the temporal domain. As such, in order to consider the temporal domain, the distance used to calculate new sample points of the blue noise mask may incorporate the temporal domain. As an example and not by way of limitation, a Manhattan distance may be used to generate a Manhattan blue noise mask. More specifically, the Manhattan distance may be used in the temporal domain. This would result in a priority in the spatial domain over the temporal domain. As such, the Manhattan blue noise mask may have improved temporal sampling over a 2D blue noise mask applied over a series of consecutive images because the temporal information captured by the Manhattan blue noise mask may be utilized for better image reconstruction over time. On the other hand, the Manhattan blue noise mask may be worse temporally compared to a 3D blue noise mask during video reconstruction, but the Manhattan blue noise mask may be better spatially during video reconstruction.

In particular embodiments, spatiotemporal sampling may be used to sample videos. In particular embodiments, spatiotemporal sampling may be used while compensating for motion. When sampling a frame of a video containing an image, the distribution of points may be random. Typically within a video many of the frames may contain the same elements. As an example and not by way of limitation, a video of a racecar will most likely have the same racecar appear in a sequence of frames. In order to reduce the need to sample the current frame, previous samples may be used in the current frame. Reducing the samples needed for a current frame may improve performance and reduce power consumption. However, not every object may be stationary within a frame, and the camera used to capture the frame may also be moving. In order to reduce the sampling load, motion-compensated spatiotemporal sampling may be used to identify previous samples of objects, determine areas in the current frame where those objects are likely to appear, and sample other areas in the current frame where information is lacking.

In particular embodiments, to determine where to sample in a current frame, samples may be retrieved from the previous frame(s). An optical flow may be used to determine which of the previously-sampled pixels continue to appear in the current frame and their respective locations in the current frame. As an example and not by way of limitation, if a previous sample is on a flagpole in the previous frame, the system may use optical flow to determine that the sampled pixel has moved to a new location in the current frame where the flagpole now appears. After the new locations of the previous samples are determined based on optical flow, invalid samples may be rejected. As an example and not by way of limitation, if an object has moved into the current location of a previous sample, then that would render the previous sample invalid. For example, if a ball moved in front of a fence where a sampling location was previously located. The remaining valid samples indicate that the pixel information in the current frame covered by those valid samples may be captured by the corresponding samples in the previous frame. This means that it may not be necessary to sample the regions nearby the valid samples. A rejection area may be defined by an area around each location of the valid samples. The rejection areas may identify areas to not sample in the current frame. A sampling pattern (e.g., a blue noise) may be used to sample the rest of the current frame (areas outside of the rejection areas). In particular embodiments, approximate Poisson-disk point filling may be used to search for a minimum value within a radius. The search for a minimum value within a radius may be used to maintain the blue noise properties of the sampling used. Pixels that are the minimum value may be accepted for sampling. After these pixels are accepted from the first round of sampling, another iteration of sampling may be performed so that the currently accepted pixels and the previous samples are used to define a rejection area. The rest of the image may then be again sampled, and the process may repeat until the entire image in the frame is sufficiently sampled.

In particular embodiments, one or more computing systems or devices may perform the processing as described herein. The computing system may be embodied as an artificial reality system, a social-networking system, a third-party system, or another computing system. The computing system may be coupled (wirelessly or wired) to cameras or other computing systems that include cameras to receive a plurality of images, such as a video comprising the plurality of images in a sequence. In particular embodiments, the computing system may include a camera to receive a plurality of images. In particular embodiments, the computing system may be embodied as an artificial reality system (e.g., an artificial reality headset) that a user wears. The plurality of images may be received from one or more cameras coupled to the artificial reality system and/or from other computing systems (e.g., a social-networking system, other artificial reality systems, third-party systems, etc.). In particular embodiments, the computing system may be a social-networking system that receives a plurality of images from other computing systems. In particular embodiments, one computing system may perform part of the processing and sends data to another computing system to process.

In particular embodiments, the computing system may receive a video comprising a sequence of frames. In particular embodiments, the computing system may receive a video from a camera coupled to the computing system. As an example and not by way of limitation, an artificial reality system may receive a video and/or video stream from a camera coupled to the artificial reality system. In particular embodiments, the computing system may receive a video from another computing system. As an example and not by way of limitation, an artificial reality system may receive a video from another artificial reality system. In particular embodiments, the video may be generated by a computing system. As an example and not by way of limitation, a computing system may generate a video synthetically using a central processing unit or a graphics processing unit. In particular embodiments, the video may comprise a sequence of frames containing images. Although this disclosure describes receiving a video in a particular manner, this disclosure contemplates receiving a video in any suitable manner.

In particular embodiments, the computing system may access a three-dimensional mask that specifies pixel-sampling locations. In particular embodiments, the computing system may have the three-dimensional mask stored and access the three-dimensional mask from storage. In particular embodiments, the computing system may request the three-dimensional mask from another computing system. As an example and not by way of limitation, an artificial reality system may request a three-dimensional mask from a third-party system, such as a server storing the three-dimensional mask. In particular embodiments, the three-dimensional mask may have a first dimension and a second dimension corresponding to a spatial domain and a third dimension corresponding to a temporal domain. There may be a blue noise property present in the pixel-sampling locations that are associated with each of a plurality of two-dimensional spatial slices of the three-dimensional mask in the spatial domain and in the pixel-sampling locations that are associated with each of a plurality of one-dimensional temporal slices of the three-dimensional mask in the temporal domain. In particular embodiments, the three-dimensional mask is generated by selecting the pixel-sampling locations using a distance function. The distance function measures a distance between any two pixel-sampling locations in the three-dimensional mask. In particular embodiments, the distance function may measure a distance between two pixel-sampling locations in the three-dimensional mask based on a Euclidean distance in the spatial domain and a Manhattan distance in the temporal domain. In particular embodiments, the distance function may be $D_{x,y,t}=\sqrt{x^2+y^2}+t$. In particular embodiments, the x, y, and t may be per-coordinate absolute differences in the respective dimensions for two points between which the distance is measured. Other distance functions may be used to measure the distance between the two pixel-sampling locations in the three-dimensional mask. In particular embodiments, the pixel-sampling locations specified by the three-dimensional mask are sequentially selected. The pixel-sampling locations may be selected based on distances, measured using the distance function, between the pixel-sampling location and previously selected pixel-sampling locations. In particular embodiments, the three-dimensional mask may be a given size. As an example and not by way of limitation, the three-dimensional mask may be 100 pixels by 100 pixels over 120 frames corresponding to a three-dimensional section of the video. In particular embodiments, the three-dimensional mask may be tileable. As an example and not by way of limitation, the three-dimensional mask may be reused adjacent to itself to appropriately sample the whole video. For example, if the video is 1000 pixels by 1000 pixels over 1000 frames and the three-dimensional mask is 100 pixels by 100 pixels over 120 frames, then in order to sample the whole video, the three-dimensional mask may be repeated across the video by applying the three-dimensional mask over the whole entire video. In the instance that the three-dimensional mask does fit to the size of the video, a fraction of the three-dimensional mask may be used. As an example and not by way of limitation, for a 100 pixels by 100 pixels by 100 frames video and a 100 pixels by 100 pixels by 120 frames three-dimensional mask, a fraction of the three-dimensional mask (e.g., 100 pixels by 100 pixels by 100 frames) may be applied to the video. Although this disclosure describes accessing a three-dimensional mask in a particular manner, this disclosure contemplates accessing a three-dimensional mask in any suitable manner.

In particular embodiments, the computing system may determine a threshold value corresponding to a desired percentage of the pixel-sampling locations to be used for sampling a video. In particular embodiments, the pixel-sampling locations in the three-dimensional mask may be associated with sequential values corresponding to a sequence in which the pixel-sampling locations are selected. As an example and not by way of limitation, a first pixel-sampling location may be associated with the sequential value, 1 and a second pixel-sampling location may be associated with a sequential value, 2 and so on. The computing system may determine a threshold number indicative of a percentage of the pixel-sampling locations to be used for generating a sample for the video. As an example and not by way of limitation, the computing system may set the percentage of pixel-sampling locations to be used to 10 percent of the pixel-sampling locations. As another example and not by way of limitation, a user may set the percentage of pixel-sampling locations to be used for sampling a video. The percentage of pixel-sampling locations to be used may correspond to power consumption of the computing system. For example, to reduce power consumption, the percentage of pixel-sampling locations to be used for sampling may be reduced. In particular embodiments, the computing system may determine the threshold value corresponding to a desired percentage of the pixel-sampling locations to be used for sampling a video based on a remaining battery life of the computing system. As an example and not by way of limitation, the computing system may set the pixel-sampling locations to be used for sampling a video to 10 percent if the battery life falls below a threshold level. In particular embodiments, the percentage of pixel-sampling locations to be used may correspond to a scaling factor. In particular embodiments, a density estimation may be used to appropriately determine the scaling factor and the corresponding percentage of pixel-sampling locations to be used. As an example and not by way of limitation, for a given area, if an area corresponds to a blacked-out part of an image, there would be no need to have a high percentage of pixel-sampling locations to be used for that part of the image. As such, the scaling factor may be reduced for that part of the image. In particular embodiments, different scaling factors may be applied to different parts of the three-dimensional mask. For example, if one part of an image is a person's solid black shirt, then the scaling factor of the three-dimensional mask would be reduced for that part of the image, but if another part of the image contains a complex pattern, then the scaling factor of the three-dimensional mask may be increased. In particular embodiments, to determine the appropriate percentage of the pixel-sampling locations, the computing system may use the sequential values associated with the pixel-sampling locations. Therefore, as an example and not by way of limitation, if 10 percent of the pixel-sampling locations are to be used, the first 10 percent of the pixel-sampling locations may be used. As an example and not by way of limitation, if there are 1000 pixel-sampling locations and the threshold value is set to 10 percent, then the first 100 pixel-sampling locations based on their sequential values may be used. In particular embodiments, the sequential values may be from zero to one. The threshold value may represent a percentage that corresponds to the sequential values to be used. As an example and not by way of limitation, if the threshold value is 30 percent, then the pixel-sampling locations corresponding to the sequential values from 0.00 to 0.30. In particular embodiments, the computing system may select a subset of the pixel-sampling locations based on the threshold value and the sequential values associated with the pixel-sampling locations. The subset of pixel-sampling locations may correspond to the pixel-sampling locations to be used for sampling the video. As an example and not by way of limitation, when sampling the video, the computing system may use the subset of pixel-sampling locations to be applied to the video to sample the sequence of frames. Although this disclosure describes determining a threshold value corresponding to a desired percentage of the pixel-sampling locations to be used for sampling a video in a particular manner, this disclosure contemplates determining a threshold value corresponding to a desired percentage of the pixel-sampling locations to be used for sampling a video in any suitable manner.

In particular embodiments, the computing system may generate a sample of the video by sampling the sequence of frames using the three-dimensional mask. As an example and not by way of limitation, the computing system may apply the three-dimensional mask to the video to sample the video. The sample may be stored on the computing system. In particular embodiments, the computing system may transmit the sample of the video to another computing system. In particular embodiments, the sample of the video may be used to generate a reconstructed video. In particular embodiments, the computing system may use a machine-learning model to generate a reconstructed video from the sample of the video. In particular embodiments, the sample of the video may have incomplete pixel information and the reconstructed video may have complete pixel information. In particular embodiments, other computing systems may use the sample of the video to reconstruct the video at the respective computing system. As an example and not by way of limitation, if an artificial reality system captures a video and generates a sample of the video to send to another artificial reality system, the other artificial reality system may reconstruct the video based on the sample of the video. Although this disclosure describes generating a sample of a video in a particular manner, this disclosure contemplates generating a sample of a video in any suitable manner.

In particular embodiments, the computing system may access a video comprising a first frame and a second frame. As described above, a computing system may receive a video from a plurality of sources. The computing system may store a received video to access at a later time. In particular embodiments, the computing system may capture a video via a camera coupled to the computing system. In particular embodiments, the video may be a generated video from the computing system. As an example and not by way of limitation, an artificial reality system may generate video of a real-world environment with artificial reality elements. The video may have at least a first frame and a consecutive second frame. In particular embodiments, one or more objects captured within the first frame will be captured in the second frame. Although this disclosure describes accessing a video in a particular manner, this disclosure contemplates accessing a video in any suitable manner.

In particular embodiments, the computing system may determine sampling locations in a first frame of a video. As described herein, the computing system may use a two-dimensional mask to apply to a first frame to sample the first frame. In particular embodiments, the two-dimensional mask may be a blue noise mask. In particular embodiments, the computing system may determine sampling locations of the first frame by applying the blue noise mask to the first frame. In particular embodiments, if there are other frames prior to the first frame, the computing system may apply a three-dimensional mask to the other previous frames and the first frame to sample the frames. In particular embodiments, the computing system may generate a sample of the first frame using the two-dimensional mask (blue noise mask) using a threshold percentage of sampling points of the two-dimensional mask. The computing system may determine the threshold percentage as described herein. Although this disclosure describes determining sampling locations in a first frame of a video in a particular manner, this disclosure contemplates determining sampling locations in a first frame in any suitable manner.

In particular embodiments, the computing system may determine sampling locations of a second frame by transforming the sampling locations of the first frame to the second frame. In particular embodiments, the computing system may transform the sampling locations of the first frame to the second frame based on optical flow between the first frame and the second frame. In particular embodiments, the optical flow may map sampling locations of the first frame to sampling locations of the second frame, where the sampling locations correspond to pixels in the first frame and the second frame. As an example and not by way of limitation, the computing system may determine based on optical flow that a sampling location in a first frame corresponding to a pixel belonging a flagpole has moved to a new sampling location in a second frame compared to the first frame. The computing system would identify a sampling location in the second frame that corresponds to the pixel belonging to the flagpole that is the same as the pixel of the sampling location in the first frame. Thereby, the computing system may preserve the information that is already sampled and reduce the need to sample the current frame by reusing the information from the samples in the first frame. In particular embodiments, the computing system may transform the first sampling locations to the second frame by using a color temporal gradient between the first frame and the second frame. Although this disclosure describes transforming sampling locations of a first frame to a second frame in a particular manner, this disclosure contemplates transforming sampling locations of a first frame to a second frame in any suitable manner.

In particular embodiments, the computing system may select a subset of sampling locations in the second frame. The computing system may compare pixels in the first frame corresponding to the sampling locations in the first frame and pixels in the second frame corresponding to sampling locations in the second frame. As an example and not by way of limitation, if a pixel corresponding to a sampling location in the first frame belongs to a car in the first frame, the computing system may compare that pixel to a pixel in the second frame that belongs to the same car. In particular embodiments, the computing system may detect one or more invalid sampling locations in the second frame. In particular embodiments, the computing system may detect invalid sampling locations based on a determination pixels in the first frame corresponding to sampling locations in the first frame do not match pixels in the second frame corresponding to sampling locations in the second frame. As an example and not by way of limitation, the computing system may detect an invalid sampling location in a second frame if a pixel in the first frame at a first sampling location is a pixel of a car (e.g., pixel may be red), but the pixel in the second sampling location of the second frame is a pixel of a tree (e.g., pixel may be brown). That is, after transforming the sampling locations of the first frame to sampling locations of the second frame, if there is an error in what is expected to be in the sampling location of the second frame, the computing system may determine that the sampling location in the second frame is invalid. In particular embodiments, the computing system may reject the invalid sampling locations in the second frame. Thereby, the computing system may select the subset of the sampling locations in the second frame by excluding the invalid sampling locations in the second frame. In particular embodiments, the computing system may use one or more heuristics to determine whether to reject an invalid sampling location. As an example and not by way of limitation, if a neighbor pixel has a flow that is different than a threshold difference then the computing system may determine that the sampling location in the second frame is invalid. In particular embodiments, the computing system may estimate an error of the optical flow. As an example and not by way of limitation, the computing system may calculate flow vectors for one or more pixels, where the flow vectors indicate a change of position of a pixel from one frame to the next frame. The computing system may determine whether the difference between one or more flow vectors of neighboring pixels exceed a threshold difference. If the difference between flow vectors exceed the threshold difference, then the computing system may determine that the sampling location corresponding to the pixels associated with the flow vectors are invalid. In particular embodiments, the computing system may blur the optical flow and detect where an area has a change greater than a threshold change. As an example and not by way of limitation, the computing system may average flow vectors from nearby pixels. By averaging the flow vectors, the computing system may detect large changes, which may be labeled as invalid sampling locations. That is the pixels that correspond to the flow vectors that are associated with a large averaged change may be labeled as invalid sampling locations. In particular embodiments, the computing system may track the estimated error of the flow. In particular embodiments, the computing system may determine a forward optical flow and a backward optical flow. As an example and not by way of limitation, the computing system may determine the optical flow from frame I to frame I+1 and determine the optical flow from frame I+1 to frame I. If there are any inconsistencies detected between the forward optical flow and the backward optical flow, then the computing system may determine one or more invalid sampling locations. As an example and not by way of limitation, if the forward optical flow indicates that Pixel A in frame I goes to pixel B in frame I+1, but the backward optical flow indicates Pixel B in frame I+1 does not go near Pixel A in frame I, then the computing system may determine the sampling location associated with Pixel B as an invalid sampling location. Although this disclosure describes selecting a subset of sampling locations in a particular manner, this disclosure contemplates selecting a subset of sampling locations in any suitable manner.

In particular embodiments, the computing system may define one or more rejections areas in a second frame. In particular embodiments, the computing system may define the rejection areas in a second frame based on the subset of the sampling locations in the second frame that the computing system has selected. In particular embodiments, the rejections areas may be an area that have identified as sufficiently sampled by the computing system in the second frame, and as such does not need further sampling. The rejection areas define areas that do not need any further sampling. In particular embodiments, the rejection areas may be areas of a fixed radius extending from the subset of the sampling locations in the second frame. As an example and not by way of limitation, the computing system may set a radius of 10 pixels around each sampling location to generate rejections areas from the selected subset of sampling locations. Although this disclosure describes defining a rejection area in a particular manner, this disclosure contemplates defining a rejection area in any suitable manner.

In particular embodiments, the computing system may determine sampling locations in the second frame outside of the rejection areas. In particular embodiments, the computing system may identify sampling locations in the second frame to further sample. That is, the computing system may further sample areas in the second frame where there are currently insufficient samples. In particular embodiments, the computing system may generate a sample of the second frame in areas outside of the rejection areas using a two-dimensional mask comprising a blue noise property (e.g., a blue noise mask). As an example and not by way of limitation, the computing system may apply a blue noise mask to areas outside of the rejection areas. In particular embodiments, the computing system may use approximate Poisson-Disk point filling to identify sampling locations outside of the rejection areas in the second frame. While only one iteration of the process of identifying sampling locations outside of the rejection areas is discussed, the computing system may perform multiple iterations of identifying sampling locations and further defining rejections areas. As an example and not by way of limitation, the computing system may start with first sampling locations used from the first frame and define rejection areas corresponding to second sampling locations in the second frame based on the first sampling locations. The computing system may identify third sampling locations in the second outside of the rejection areas. When the second frame is still insufficiently sampled, the computing system may redefine rejection areas based on the second sampling locations and the third sampling locations and then identify fourth sampling locations. The computing system may perform multiple iterations of this process to fully sample the frame. Although this disclosure describes determining sampling locations in a frame outside of rejection areas in a particular manner, this disclosure contemplates determining sampling locations in a frame outside of rejection areas in any suitable manner.

In particular embodiments, the computing system may generate a sample of the video based on the sampling locations in the second frame. In particular embodiments, the computing system may generate a sample of a video based on pixels in the first frame corresponding to the sampling locations in the first frame and pixels in the second frame corresponding to the sampling locations identified outside of the rejection areas. The computing system may reduce the sampling needed to generate the sample of the video by reusing the samples from the first frame to identify only areas where the computing system needs to further sample in a second frame. In particular embodiments, the computing system may store the sample of the video. In particular embodiments, the computing system may transmit the sample to other computing systems as described herein. Although this disclosure describes generating a sample of a video in a particular manner, this disclosure contemplates generating a sample of a video in any suitable manner.

Referring to FIG. 1, an example process 100 of reconstructing an image is shown. In particular embodiments, the process 100 may begin with a computing system receiving an image 102. In particular embodiments, the computing system may be an artificial reality system, smartphone, or other computing system. As an example and not by way of limitation, the computing system may be an artificial reality headset that includes a camera to capture the image 102. In particular embodiments, a sampling mask 104 may be applied to the image 102 to generate a sampled image 106. In particular embodiments, the computing system may use a process of image reconstruction 108 to reconstruct the image by using the sampled image 106. As an example and not by way of limitation, the computing system may use a machine-learning model to perform the image reconstruction process 108. In particular embodiments, the computing system may use other methods of image reconstruction. In particular embodiments, after performing image reconstruction 108 using the sampled image 106, the computing system may generate a reconstructed image 110. While the process 100 is described as being performed by a single computing system, one or more parts of the process 100 may be performed by one or more computing systems. As an example and not by way of limitation, a computing system may generate a sample image 106 and send the sample image 106 to another computing system to reconstruct the image using an image reconstruction process 108 to generate a reconstructed image 110.

Figure 2:
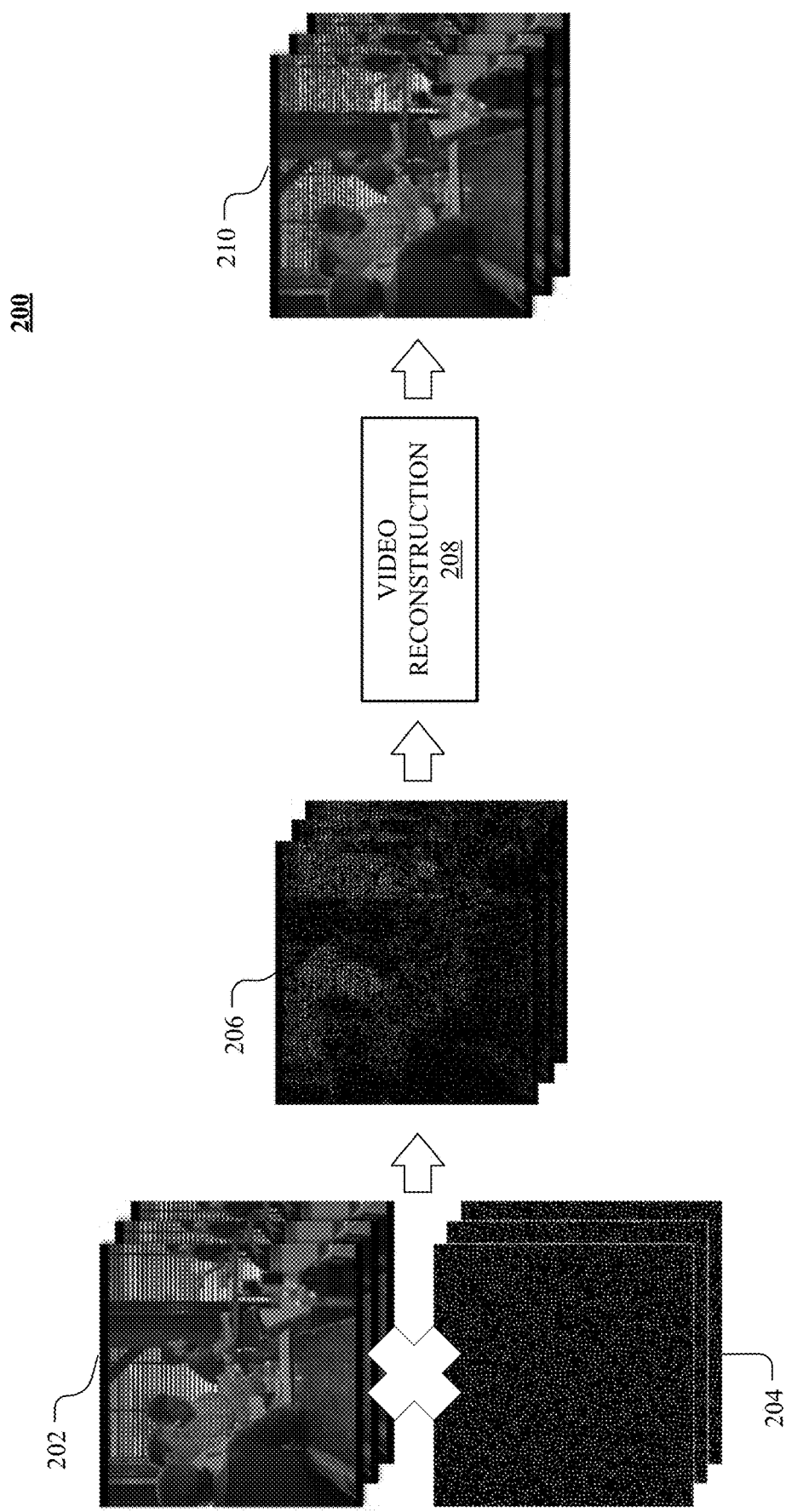
FIG. 2 illustrates an example process of reconstructing a video.

Referring to FIG. 2, an example process 200 of reconstructing a video is shown. In particular embodiments, the process 200 may begin with a computing system receiving a video 202 comprising a plurality of images. In particular embodiments, the computing system a sampling mask 204 may be applied to the video 202 to generate a sample 206 of the video 202. In particular embodiments, the computing system use a process of video reconstruction 208 to reconstruct the video by using the sample 206 of the video 202. As an example and not by way of limitation, the computing system may use a machine-learning model to perform the video reconstruction process 208. In particular embodiments, the computing system may use other methods of video reconstruction. In particular embodiments, after performing video reconstruction 208 using the sample 206 of the video 202, the computing system may generate a reconstructed video 210. While the process 200 is described as being performed by a single computing system, one or more parts of the process 200 may be performed by one or more computing systems. As an example and not by way of limitation, a computing system may generate a sample 206 of the video 202 and send the sample 206 to another computing system to reconstruct the video using a video reconstruction process 208 to generate a reconstructed video 210.

Figure 3:
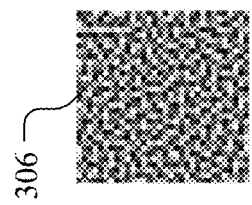
FIG. 3 illustrates an example process of generating a sampling mask.
Figure 3:
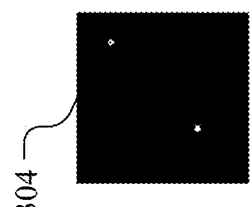
Figure 3:
Figure 3:
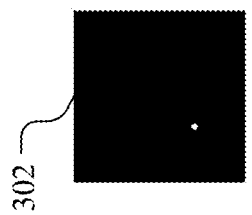

Referring to FIG. 3, an example process 300 of generating a sampling mask is shown. In particular embodiments, the process 300 may be a process 300 of generating a blue noise mask. In particular embodiments, the process 300 may begin with selecting a point 302 (e.g., a sampling location). The point 302 may randomly selected as an initial sampling location. In particular embodiments, the point 302 may be assigned a sequential value. As an example and not by way of limitation, the point 302 may be assigned a sequential value of 1. In particular embodiments, the process 300 may use a distance function to determine a second point 304 as described herein. The second point 304 may be assigned a sequential value. As an example and not by way of limitation, the second point 304 may be assigned the sequential value of 2. The process 300 may continue until all sampling locations are determined within the two-dimensional space to generate a sampling mask 306. In particular embodiments, each of the sampling locations may be assigned a sequential value. In particular embodiments, the sampling mask 306 may be a given size. As an example and not by way of limitation, the sampling mask 306 may be 1000 pixels by 1000 pixels. In particular embodiments, the sampling mask 306 may comprise blue noise properties.

Figure 4:
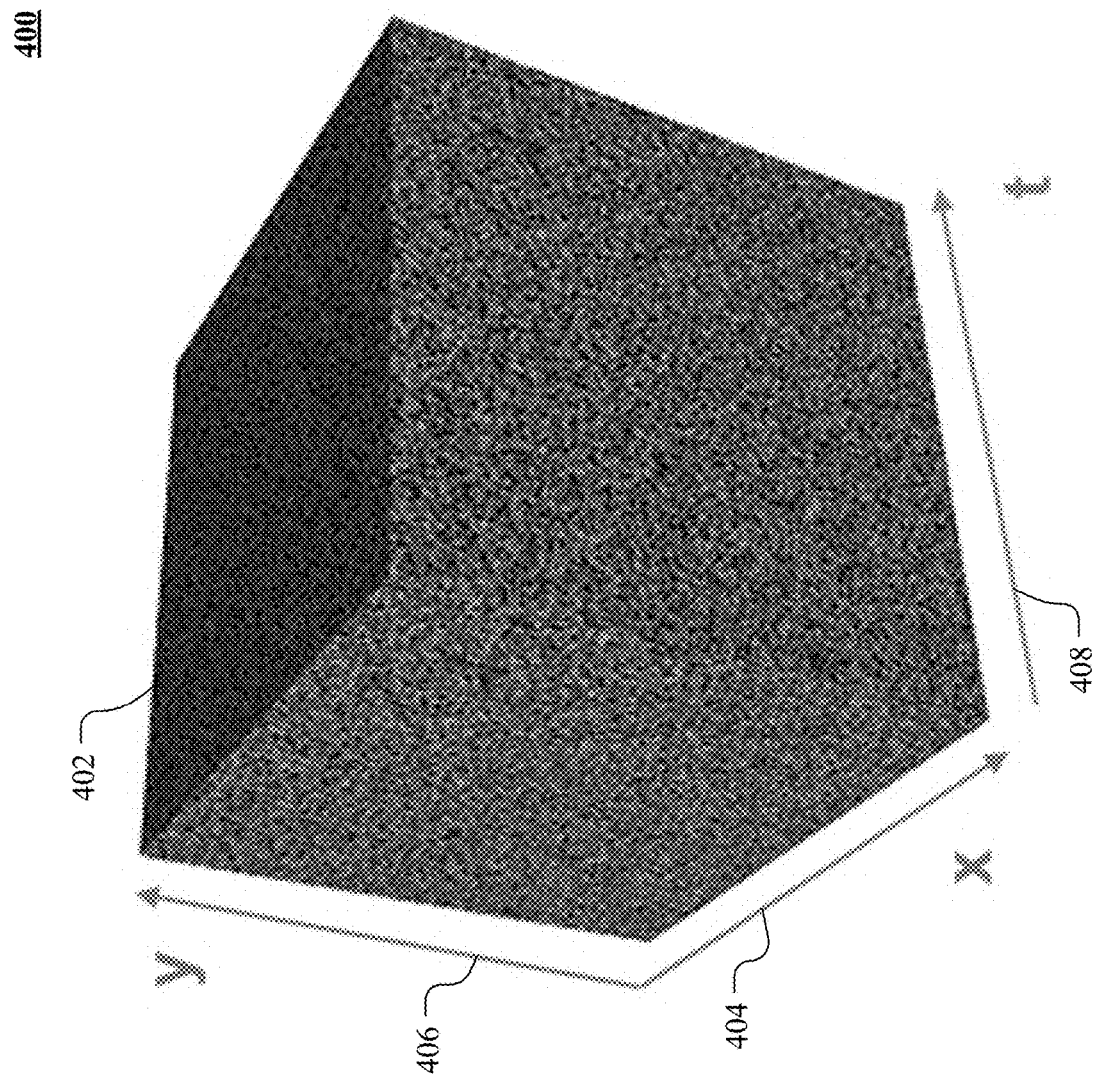
FIG. 4 illustrates an example three-dimensional sampling mask.

Referring to FIG. 4, an example three-dimensional sampling mask 402 of a three-dimensional space 400 is shown. In particular embodiments, the three-dimensional sampling mask 402 may comprise a spatial domain consisting of an x-axis 404 and a y-axis 406. In particular embodiments, the three-dimensional sampling mask 402 may comprise a temporal domain consisting of a t-axis 408. In particular embodiments, the three-dimensional sampling mask 402 may comprise blue noise properties. As an example and not by way of limitation, the three-dimensional sampling mask 402 may comprise blue noise properties in two-dimensional spatial slices of the three-dimensional sampling mask 402 in the spatial domain and in one-dimensional temporal slices of the three-dimensional sampling mask 402 in the temporal domain. In particular embodiments, the three-dimensional sampling mask 402 may be generated by a process using a distance function to sequentially select sampling locations as described herein. In particular embodiments, the three-dimensional sampling mask 402 may be applied to a video to sample the video. In particular embodiments, a threshold percentage of the sampling locations of the three-dimensional sampling mask 402 may be used to sample a video as described herein.

Figure 5:
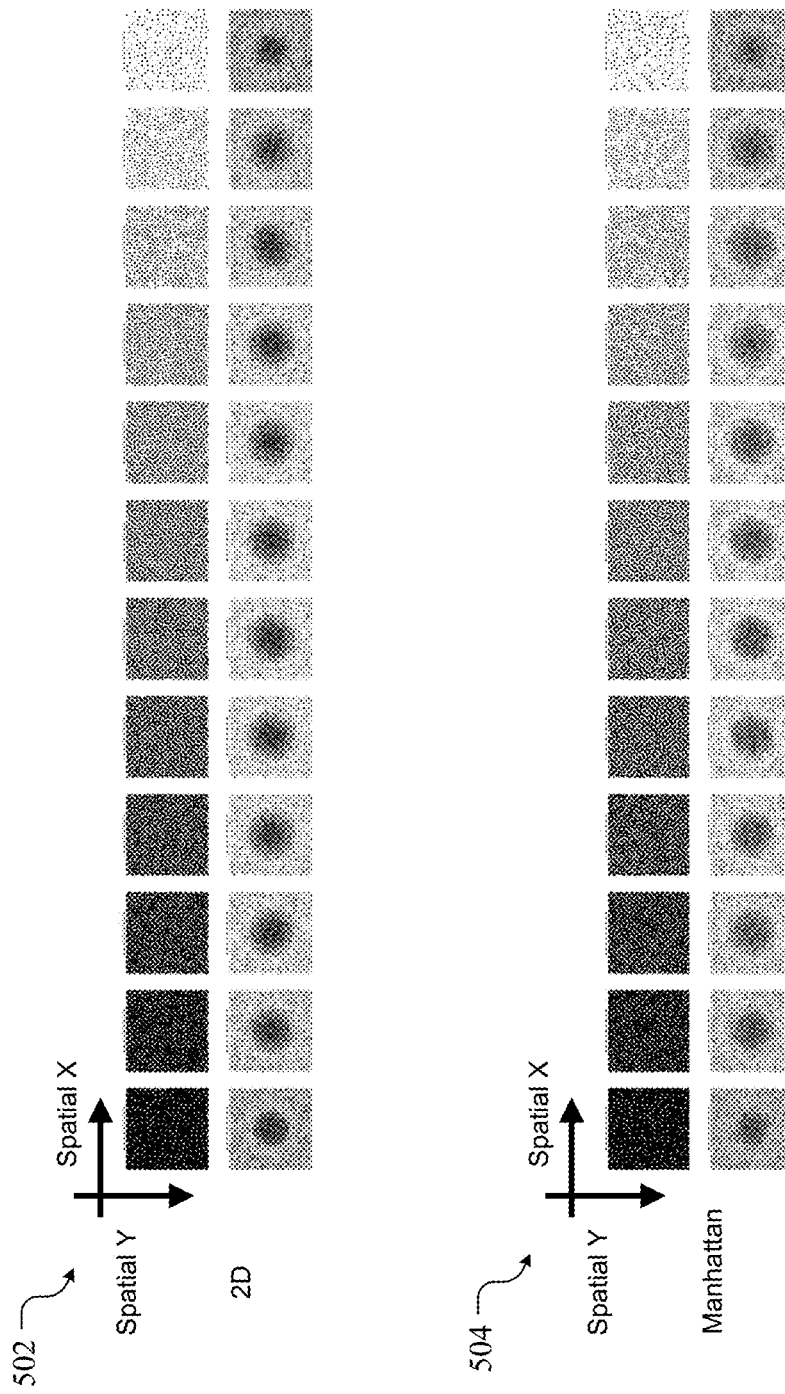
FIG. 5 illustrates an example comparison between a two-dimensional sampling mask to another sampling mask.

FIG. 5 illustrates a comparison 500 between a two-dimensional sampling mask 502 to a Manhattan blue noise sampling mask 504 in a spatial domain. In particular embodiments, the two-dimensional sampling mask 502 may be a blue noise mask. In particular embodiments, the Manhattan blue noise sampling mask 504 may be generated based on a distance function that uses the Manhattan distance with respect to the temporal domain. As an example and not by way of limitation, the distance function used to generate a Manhattan blue noise sampling mask 504 may be $D_{x,y,t} = \sqrt{x^2+y^2} + t$. In particular embodiments, the top row corresponding to the two-dimensional sampling mask 502 may correspond to various percentages of samples of the two-dimensional sampling mask 502, where there is an increasing number of samples going from left to right. As an example and not by way of limitation, the initial sampling mask shown on the right may be using a threshold of 1 percent of samples of the two-dimensional sampling mask 502 and the final sampling mask shown on the left may be using a threshold of 80 percent of samples of the two-dimensional sampling mask 502. The bottom row corresponding to the two-dimensional sampling mask 502 may represent an absolute value of the Fourier transform of the respective sampling mask on the top row. As shown by the absolute value of the Fourier transform, the two-dimensional sampling mask 502 may have blue noise properties at various threshold percentages of samples used. In particular embodiments, the top row corresponding to the Manhattan blue noise sampling mask 504 may correspond to various percentages of samples of the Manhattan blue noise sampling mask 504, where there is an increasing number of samples going from left to right. As an example and not by way of limitation, the initial sampling mask shown on the left may be using a threshold of 1 percent of samples of the Manhattan blue noise sampling mask 504 and the final sampling mask shown on the right may be using a threshold of 80 percent of samples of the Manhattan blue noise sampling mask 504. The bottom row corresponding to the Manhattan blue noise sampling mask 502 may represent an absolute value of the Fourier transform of the respective sampling mask on the top row. As shown by the comparison 500, while a different distance function is used to determine the sampling locations in the Manhattan blue noise sampling mask 504, the Manhattan blue noise sampling mask 504 still retains blue noise properties within the spatial domain as compared to the two-dimensional sampling mask 502.

Figure 6:
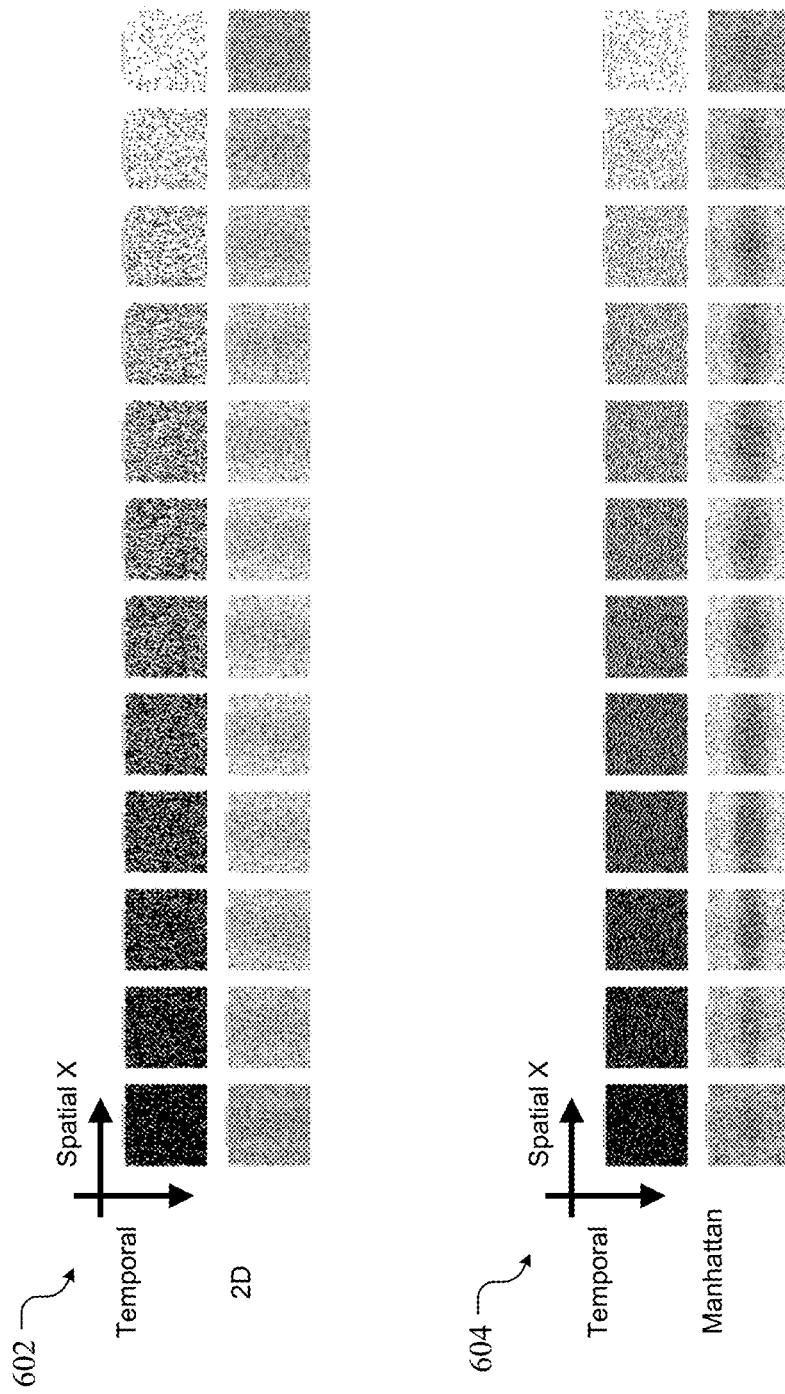
FIG. 6 illustrates another example comparison between a two-dimensional sampling mask to another sampling mask.

Referring to FIG. 6, a comparison 600 between a two-dimensional sampling mask 602 to a Manhattan blue noise sampling mask 604 in a temporal domain. The two-dimensional sampling mask 602 may be the same as the two-dimensional sampling mask 502 and the Manhattan blue noise sampling mask 604 may be the same as the Manhattan blue noise sampling mask 504. In particular embodiments, the top row corresponding to the two-dimensional sampling mask 602 may correspond to various percentages of samples of the two-dimensional sampling mask 602, where there is an increasing number of samples going from left to right. As an example and not by way of limitation, the initial sampling mask shown on the right may be using a threshold of 1 percent of samples of the two-dimensional sampling mask 602 and the final sampling mask shown on the right may be using a threshold of 80 percent of samples of the two-dimensional sampling mask 602. The bottom row corresponding to the two-dimensional sampling mask 602 may represent an absolute value of the Fourier transform of the respective sampling mask on the top row. As shown by the absolute value of the Fourier transform, the two-dimensional sampling mask 602 may not have blue noise properties with respective to the temporal domain. In particular embodiments, the top row corresponding to the Manhattan blue noise sampling mask 604 may correspond to various percentages of samples of the Manhattan blue noise sampling mask 604, where there is an increasing number of samples going from left to right. As an example and not by way of limitation, the initial sampling mask shown on the left may be using a threshold of 1 percent of samples of the Manhattan blue noise sampling mask 604 and the final sampling mask shown on the right may be using a threshold of 80 percent of samples of the Manhattan blue noise sampling mask 604. The bottom row corresponding to the Manhattan blue noise sampling mask 602 may represent an absolute value of the Fourier transform of the respective sampling mask on the top row. As shown by the comparison 600, by using a different distance function to determine the sampling locations in the Manhattan blue noise sampling mask 604, the Manhattan blue noise sampling mask 604 is able to retain blue noise properties within the temporal domain as compared to the two-dimensional sampling mask 602. This may provide the Manhattan blue noise sampling mask 604 a benefit to sampling videos because it is able to retain some of the blue noise properties across the temporal domain.

Figure 7:
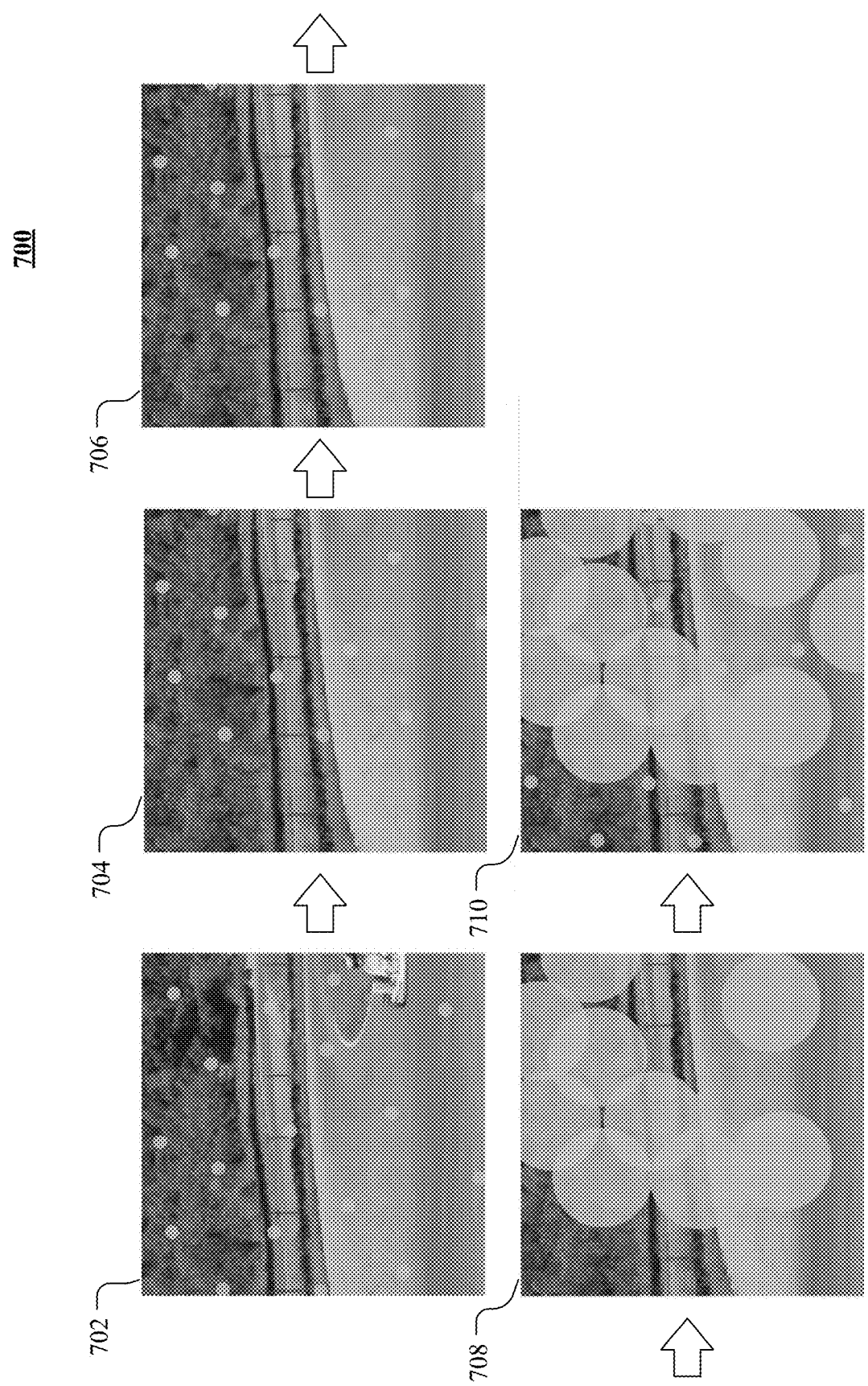
FIG. 7 illustrates an example process of compensating for motion when sampling.

FIG. 7 illustrates an example process 700 of compensating for motion when sampling. In particular embodiments, the process 700 may begin with an initial step 702 of determining a plurality of sampling locations. In particular embodiments, the sampling locations may be obtained by applying a blue noise mask over the image within an initial frame. Continuing the process 700, the camera may pan to the left in a second step 704. In particular embodiments, some of the sampling locations that were initially determined from step 702 may be retained in the second step 704 as the camera pans to the left. That is, the same sampling locations that correspond to pixels that appear in the image after the camera pans to the left are retained in step 704. As an example and not by way of limitation, a pixel corresponding to a wood post may be retained in the second step since it appears in the image after the camera pans to the left. In particular embodiments, the sampling locations from the initial image in step 702 may be transformed to the new positions of the image in step 704 as described herein. As an example and not by way of limitation, the process 700 may use optical flow to transform the sampling locations from the initial image in step 702 to the new positions of the image in step 704. In particular embodiments, in step 706 the invalid sampling locations corresponding to invalid pixels may be rejected or removed. As shown in the image in step 706, several sampling locations from the image in step 704 are removed. These sampling locations may be removed because there could be pixels that are incorrect in the current frame. As an example and not by way of limitation, if a pixel corresponding to a sampling location is initially red and the pixel in the transformed sampling location is now blue, then the sampling location may be rejected since the pixel is invalid as it does not match the previous pixel. The process 700 in step 706 may select a subset of sampling locations of the initial sampling locations determined from the first step 702. After selecting a subset of sampling locations, in step 708 the process 700 may define rejection areas around the subset of sampling locations. The rejection areas may be generated using a predefined radius from each of the sampling locations of the subset of sampling locations. After the rejection areas are defined in step 708, the process 700 continues to step 710 where additional sampling locations are identified in the frame based on techniques described herein. After identifying the additional sampling locations, the process 700 may determine sampling locations corresponding to the image by retrieving the sampling locations that are retained and adding the additional sampling locations. The process 700 may generate a sample of the image in the frame by applying a sampling mask corresponding to the identified sampling locations to the image in the frame.

Figure 8:
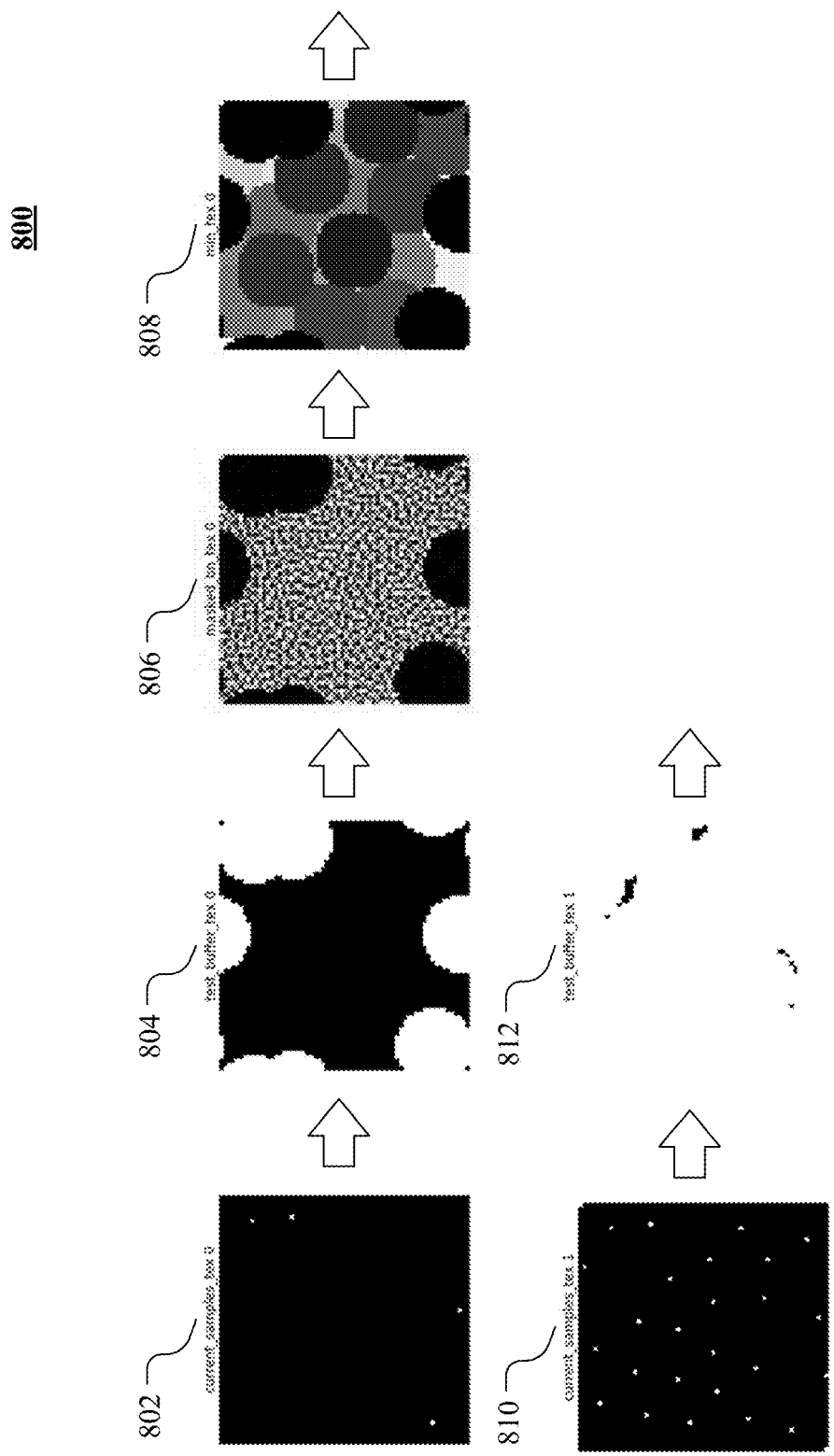
FIG. 8 illustrates an example process of distributing new samples based on previous samples.

FIG. 8 illustrates an example process 800 of distributing new samples based on previous samples. In particular embodiments, the process 800 may initially begin with previous samples in step 802. The previous samples may be from an initial frame that have valid sampling locations to be applied to the current frame. In step 804, the process 800 may define a rejection area around the valid sampling locations from step 802. After defining the rejection areas, the process may apply a sampling mask to the area outside of the rejection areas in step 806. As an example and not by way of limitation, the process 800 may apply a blue noise mask to the area outside of the rejection areas in step 806. In particular embodiments, the process 800 may use approximate Poisson-Disk point filling to identify circles of a radius in step 808. In step 810, the process 800 may accept a pixel or sampling location if it is the minimum value within the radius of the corresponding circle. The minimum value may correspond to the blue noise mask generated in step 806 within the circles of step 808. In particular embodiments, in step 812 the process 800 may repeat by redefining rejection areas similar to step 804. In order to sufficiently sample the rest of the image in the frame, the process 800 may repeat step 804 to step 810 as necessary to fill any gaps of samples. As an example and not by way of limitation, the process 800 may repeat until the rejection areas defined by the sampling points encompass the whole image.

Figure 9:
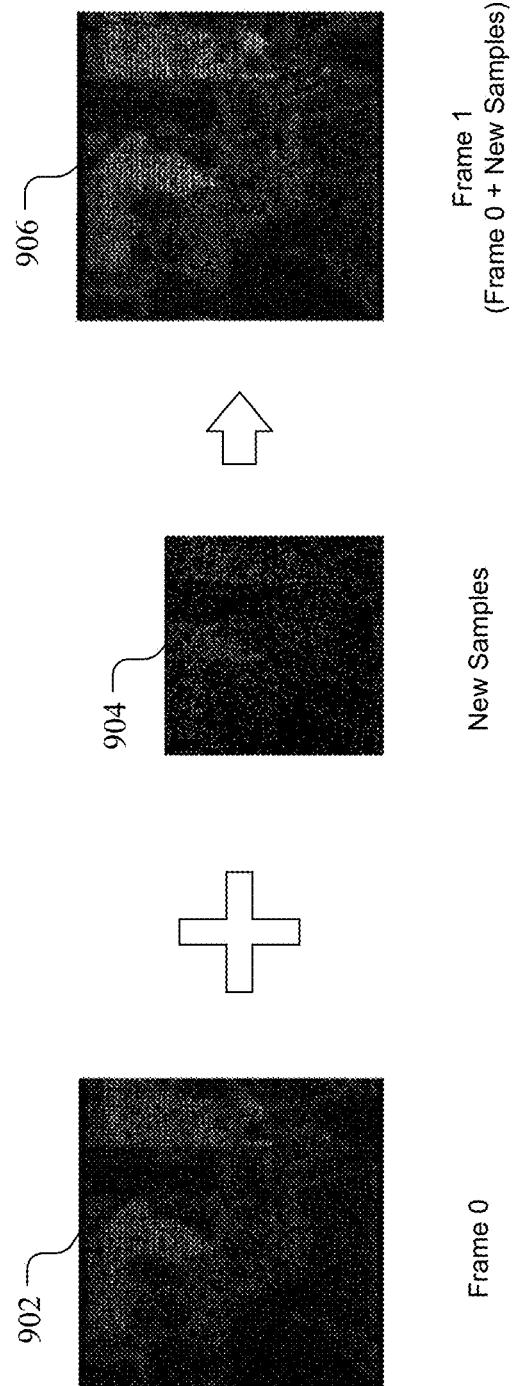
FIG. 9 illustrates an example process of combining previous samples with new samples.

FIG. 9 illustrates an example process 900 of combining previous samples with new samples. In particular embodiments, the process 900 may start with a frame 0 902 that includes samples from a previous frame. The samples of frame 0 902 may be from applying a blue noise mask to an image in a previous frame as described herein. In particular embodiments, the new samples 904 may be identified as described herein. In particular embodiments, the process 900 may combine the samples of frame 0 902 and the new samples 904 to generate frame 1 906 that includes both the samples of frame 0 902 and the new samples 904. Frame 1 906 may represent all of the samples for the current frame to sufficient sample the current frame.

Figure 10:
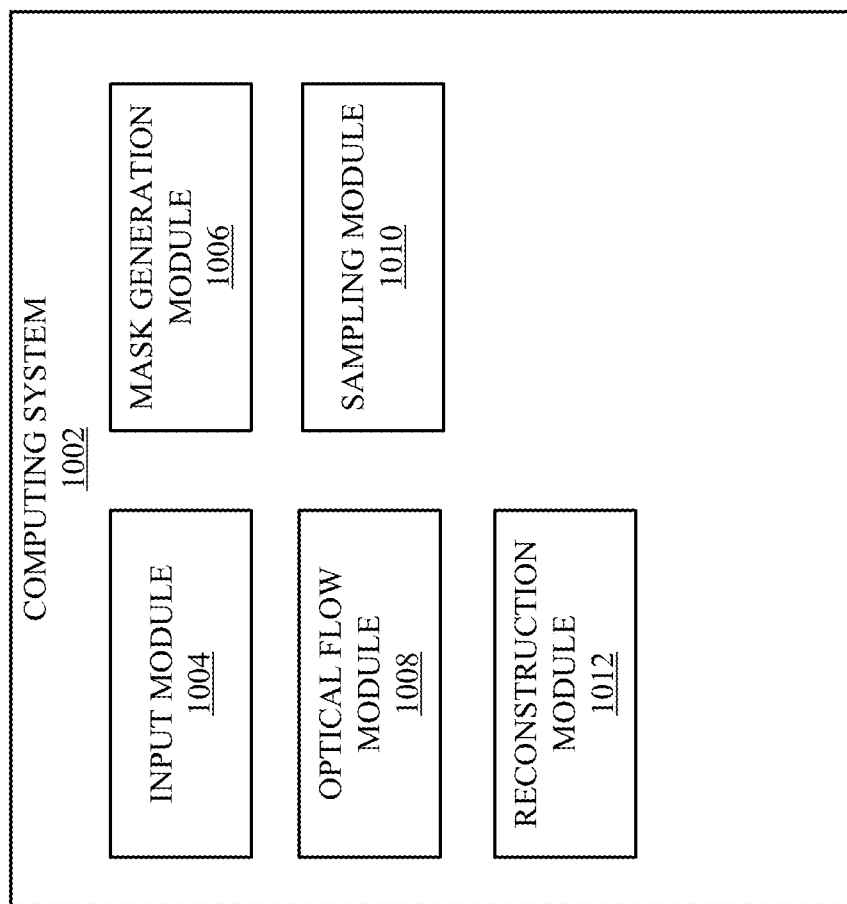
FIG. 10 illustrates an example computing system.

FIG. 10 illustrates an example computing system 1002 of a computing environment 1000. In particular embodiments, the computing system 1002 may be embodied as an artificial reality system, a mobile device, a desktop, a server, and other computing systems as described herein. In particular embodiments, the computing system 1002 may comprise an input module 1004, a mask generation module 1006, an optical flow module 1008, a sampling module 1010, a reconstruction module 1012, and other modules to help generate a sample of a video. The computing system may have similar or the same functionalities as the computing system described herein.

In particular embodiments, the input module 1004 may interface one or more computing systems to receive a video comprising a plurality of frames containing images. In particular embodiments, the input module 1004 may interface a camera coupled to the computing system 1002 to receive input data comprising a video comprising a plurality of frames containing images. As an example and not by way of limitation, the input module 1004 may interface a camera to receive a video stream. As another example and not by way of limitation, the input module 1004 may request a video from a computing system. As an example and not by way of limitation, the input module 1004 may communicate with a server to request a video comprising a plurality of frames containing images. In particular embodiments, the input module 1004 may store the input data (e.g., a video) on the computing system 1002. The input module 1004 may send the input data, such as a video, to other modules of the computing system 1002. As an example and not by way of limitation, the input module 1004 may send the input data to the optical flow module 1008 and the sampling module 1010.

In particular embodiments, the mask generation module 1006 may generate a two-dimensional sampling mask and a three-dimensional sampling mask. In particular embodiments, the mask generation module 1006 may generate a blue noise mask, either a two-dimensional blue noise mask or a three-dimensional blue noise mask. In particular embodiments, the mask generation module 1006 may use various distance functions to generate the blue noise mask. In particular embodiments, specific distance functions may be used for a two-dimensional sampling mask or a three-dimensional sampling mask. Multiple distance functions may be used to generate either a two-dimensional sampling mask or a three-dimensional sampling mask. In particular embodiments, the mask generation module may store the generated sampling masks. In particular embodiments, the mask generation module 1006 may calculate a Manhattan distance in order to generate a particular three-dimensional sampling mask. The mask generation module 1006 may use the Manhattan distance in order to generate a blue noise mask based on the Manhattan distance. In particular embodiments, the mask generation module 1006 may generate sampling masks that comprise blue noise properties in the spatial domain and the temporal domain as described herein. In particular embodiments, the mask generation module 1006 may send the sampling masks to other modules of the computing system 1002. As an example and not by way of limitation, the mask generation module 1006 may send a sampling mask to the optical flow module 1008, the sampling module 1010, or the reconstruction module 1012.

In particular embodiments, the optical flow module 1008 may calculate an optical flow. In particular embodiments, the optical flow module 1008 may receive data from other modules of the computing system 1002 to calculate the optical flow. In particular embodiments, the optical flow may be used to transform sampling locations of a first frame to sampling locations of a second frame as described herein. In particular embodiments, the optical flow module 1008 may also perform other gradient calculations, such as determining a color gradient to transform the sampling locations of a first frame to sampling locations of a second frame. In particular embodiments, the optical flow module 1008 may generate output data corresponding to the optical flow. The optical flow module 1008 may send the output data to other modules of the computing system 1002. As an example and not by way of limitation, the optical flow module 1008 may send the output data to the sampling module 1010.

In particular embodiments, the sampling module 1010 may generate a sample of an image, video, and the like based on what it receives from the input module 1004. In particular embodiments, the sampling module 1010 may receive a video comprising a plurality of frames containing images from the input module 1004. In particular embodiments, the sampling module 1010 may request a sampling mask from the mask generation module 1006 based on the received input from the input module 1004. As an example and not by way of limitation, if the sampling module 1010 receives a video from the input module 1004, then the sampling module 1010 may request a three-dimensional sampling mask from the mask generation module. In particular embodiments, the sampling module 1010 may receive output data from the optical flow module 1008. In particular embodiments, the sampling module 1010 may use the output data corresponding to the optical flow to efficiently sample a current frame as described herein. As an example and not by way of limitation, if the sampling module 1010 generated a sample of a first frame, the sampling module 1010 may use the optical flow to transform the samples from the first frame to a consecutive second frame based on the optical flow. In particular embodiments, the sampling module 1010 may generate a sample of a video or an image. In particular embodiments, the sampling module 1010 may send the sample to other modules of the computing system 1002. As an example and not by way of limitation, the sampling module 1010 may send the sample to the reconstruction module 1012. In particular embodiments, the sampling module 1010 may receive a sample from another computing system and store the sample to be reconstructed by the reconstruction module 1012. In particular embodiments, the sampling module 1010 may send the generated sample to other computing systems. As an example and not by way of limitation, the sample may be sent to another computing system to reconstruct the sample.

In particular embodiments, the reconstruction module 1012 may reconstruct an image or video based on a received sample of the image or video. In particular embodiments, the reconstruction module 1012 may receive a sample from the sampling module 1010. In particular embodiments, the reconstruction module 1012 may use a machine-learning model to reconstruct an image or video from the sample received from the sampling module 1010. In particular embodiments, the reconstruction module 1012 may send the reconstructed image or video to a display to present to a user. As an example and not by way of limitation, if the reconstructed video is of a user on a stream of a virtual call, the reconstruction module 1012 may send the reconstructed video to a display to present the reconstructed video to the user.

Figure 11:
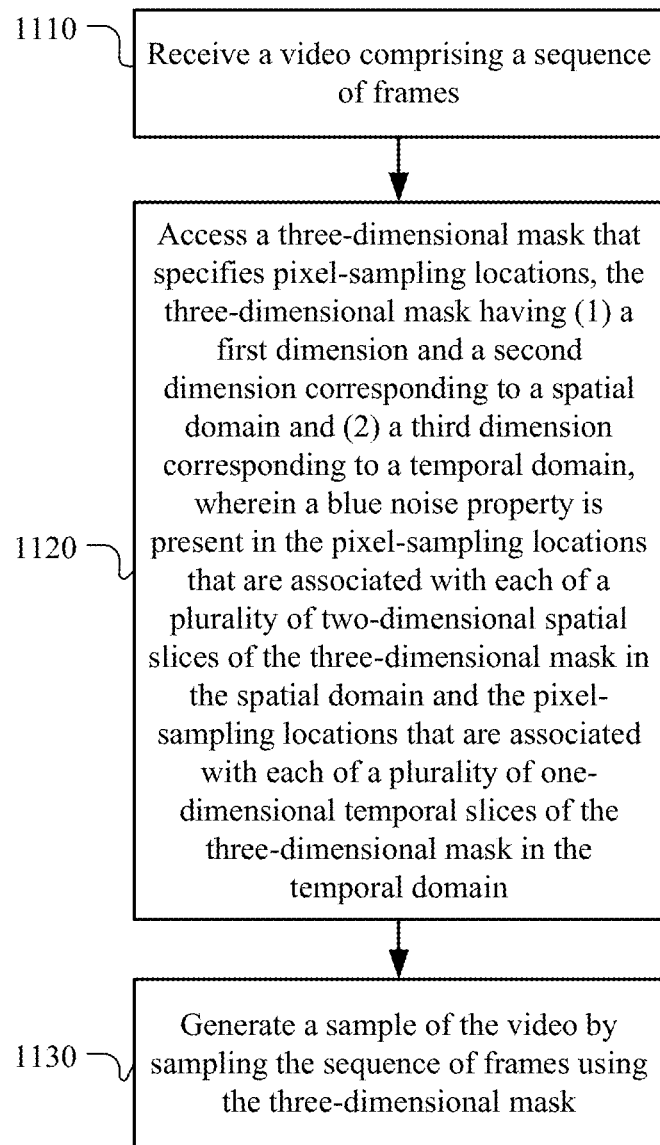
FIG. 11 illustrates an example method for sampling a video using a three-dimensional mask.

FIG. 11 illustrates an example method 1100 for sampling a video using a three-dimensional mask. The method 1100 may begin at step 1110, where a computing system may receive a video comprising a sequence of frames. At step 1120, the computing system may access a three-dimensional mask that specifies pixel-sampling locations, the three-dimensional mask having a first dimension and a second dimension corresponding to a spatial domain and a third dimension corresponding to a temporal domain. In particular embodiments, a blue noise property may be present in the pixel-sampling locations that are associated with each of a plurality of two-dimensional spatial slices of the three-dimensional mask in the spatial domain and the pixel-sampling locations that are associated with each of a plurality of one-dimensional temporal slices of the three-dimensional mask in the temporal domain. At step 1130, the computing system may generate a sample of the video by sampling the sequence of frames using the three-dimensional mask. Particular embodiments may repeat one or more steps of the method of FIG. 11, where appropriate. Although this disclosure describes and illustrates particular steps of the method of FIG. 11 as occurring in a particular order, this disclosure contemplates any suitable steps of the method of FIG. 11 occurring in any suitable order. Moreover, although this disclosure describes and illustrates an example method for sampling a video using a three-dimensional mask, including the particular steps of the method of FIG. 11, this disclosure contemplates any suitable method of sampling a video using a three-dimensional mask, including any suitable steps, which may include all, some, or none of the steps of the method of FIG. 11, where appropriate. Furthermore, although this disclosure describes and illustrates particular components, devices, or systems carrying out particular steps of the method of FIG. 11, this disclosure contemplates any suitable combination of any suitable components, devices, or systems carrying out any suitable steps of the method of FIG. 11.

Figure 12:
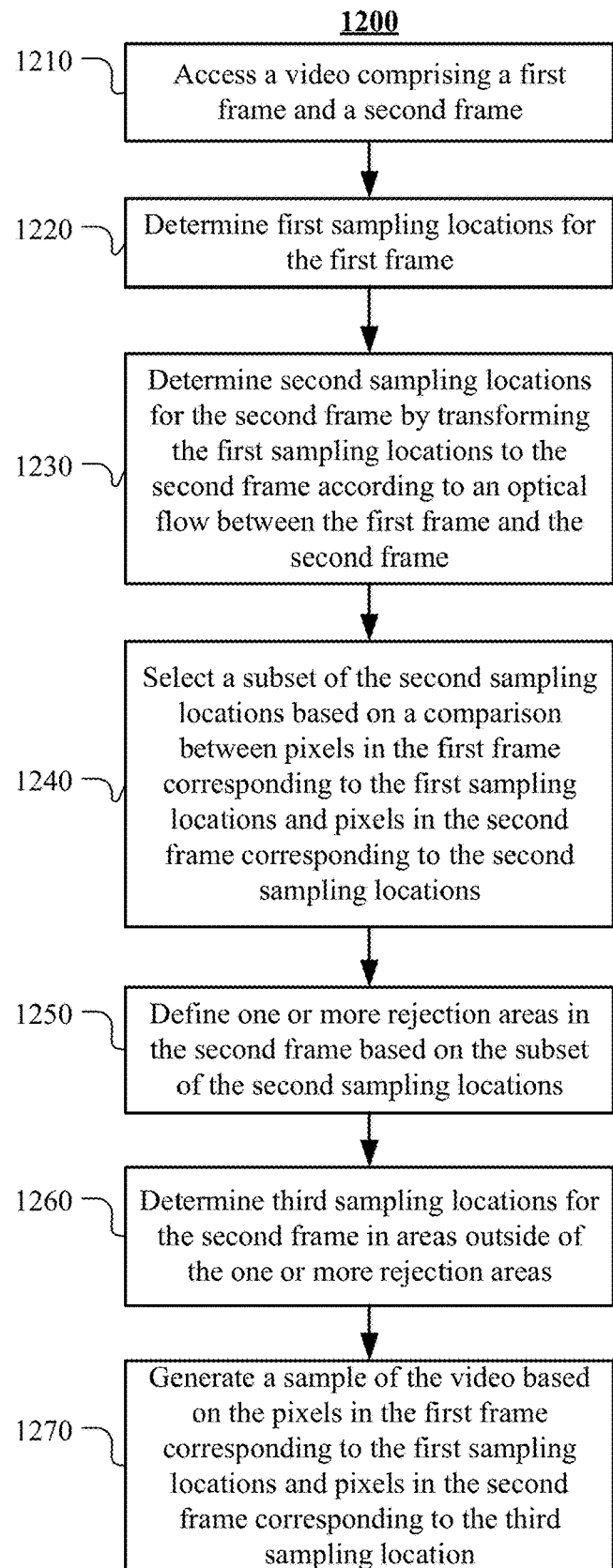
FIG. 12 illustrates an example method for sampling a video using sampling locations from previous frames.

FIG. 12 illustrates an example method 1200 for sampling a video using sampling locations from previous frames. The method 1200 may begin at step 1210, where a computing system may access a video comprising a first frame and a second frame. At step 1220, the computing system may determine first sampling locations for the first frame. At step 1230, the computing system may determine second sampling locations for the second frame by transforming the first sampling locations to the second frame according to an optical flow between the first frame and the second frame. At step 1240, the computing system may select a subset of the second sampling locations based on a comparison between pixels in the first frame corresponding to the first sampling locations and pixels in the second frame corresponding to the second sampling locations. At step 1250, the computing system may define one or more rejection areas in the second frame based on the subset of the second sampling locations. At step 1260, the computing system may determine third sampling locations for the second frame in areas outside of the one or more rejection areas. At step 1270, the computing system may generate a sample of the video based on the pixels in the first frame corresponding to the first sampling locations and pixels in the second frame corresponding to the third sampling location. Particular embodiments may repeat one or more steps of the method of FIG. 12, where appropriate. Although this disclosure describes and illustrates particular steps of the method of FIG. 12 as occurring in a particular order, this disclosure contemplates any suitable steps of the method of FIG. 12 occurring in any suitable order. Moreover, although this disclosure describes and illustrates an example method for sampling a video using sampling locations from previous frames, including the particular steps of the method of FIG. 12, this disclosure contemplates any suitable method of sampling a video using sampling locations from previous frames, including any suitable steps, which may include all, some, or none of the steps of the method of FIG. 12, where appropriate. Furthermore, although this disclosure describes and illustrates particular components, devices, or systems carrying out particular steps of the method of FIG. 12, this disclosure contemplates any suitable combination of any suitable components, devices, or systems carrying out any suitable steps of the method of FIG. 12.

Although this disclosure describes and illustrates processes in context of a computing system performing various functions, another computing system (e.g., a server embodied as social-networking system 1360 or third-party system 1370) may handle the processing and send the results to the computing system.

Figure 13:
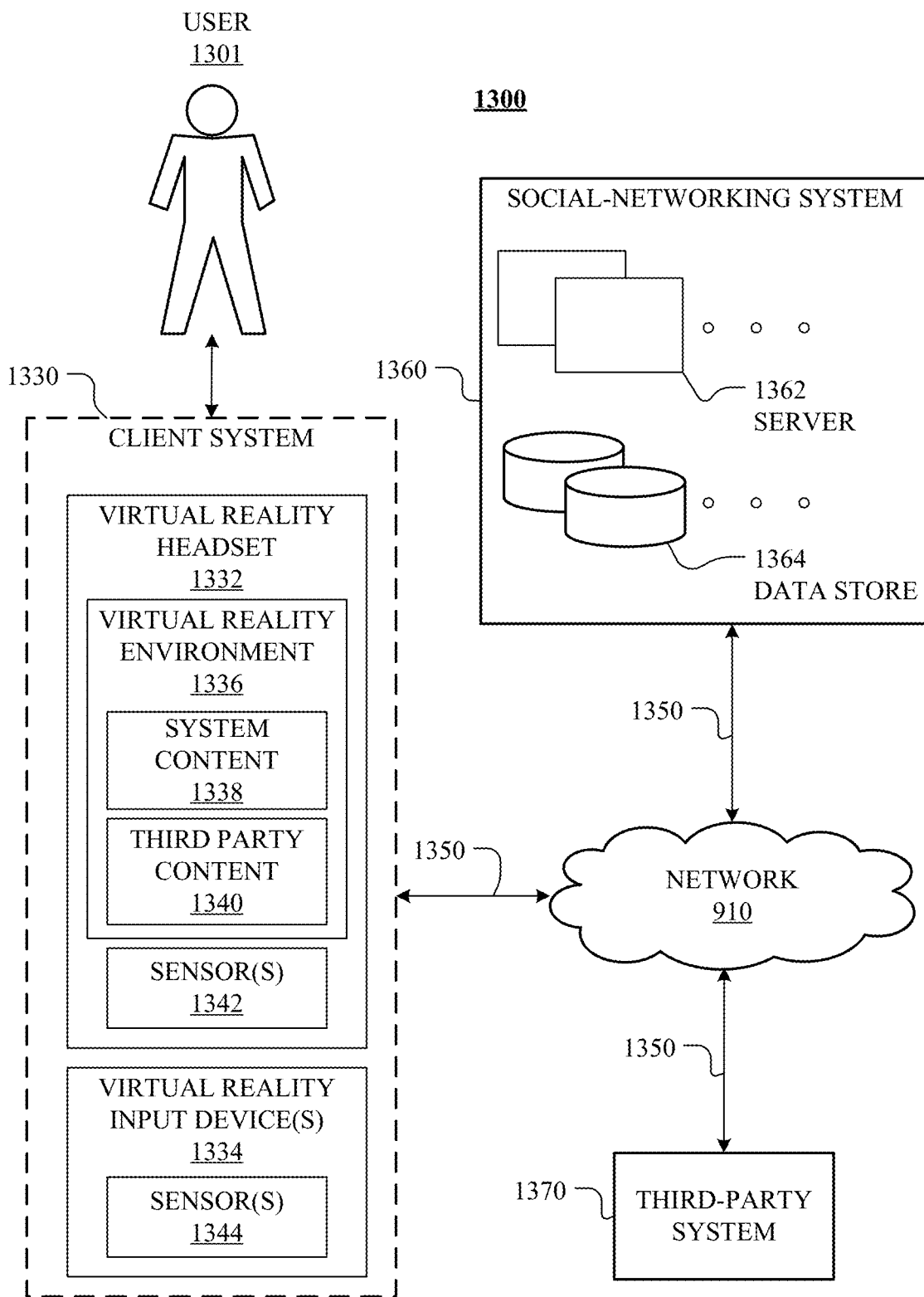
FIG. 13 illustrates an example network environment.

FIG. 13 illustrates an example network environment 1300 associated with a virtual reality system. Network environment 1300 includes a user 1301 interacting with a client system 1330, a social-networking system 1360, and a third-party system 1370 connected to each other by a network 1310. Although FIG. 13 illustrates a particular arrangement of a user 1301, a client system 1330, a social-networking system 1360, a third-party system 1370, and a network 1310, this disclosure contemplates any suitable arrangement of a user 1301, a client system 1330, a social-networking system 1360, a third-party system 1370, and a network 1310. As an example and not by way of limitation, two or more of a user 1301, a client system 1330, a social-networking system 1360, and a third-party system 1370 may be connected to each other directly, bypassing a network 1310. As another example, two or more of a client system 1330, a social-networking system 1360, and a third-party system 1370 may be physically or logically co-located with each other in whole or in part. Moreover, although FIG. 13 illustrates a particular number of users 1301, client systems 1330, social-networking systems 1360, third-party systems 1370, and networks 1310, this disclosure contemplates any suitable number of client systems 1330, social-networking systems 1360, third-party systems 1370, and networks 1310. As an example and not by way of limitation, network environment 1300 may include multiple users 1301, client systems 1330, social-networking systems 1360, third-party systems 1370, and networks 1310.

This disclosure contemplates any suitable network 1310. As an example and not by way of limitation, one or more portions of a network 1310 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. A network 1310 may include one or more networks 1310.

Links 1350 may connect a client system 1330, a social-networking system 1360, and a third-party system 1370 to a communication network 1310 or to each other. This disclosure contemplates any suitable links 1350. In particular embodiments, one or more links 1350 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 1350 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 1350, or a combination of two or more such links 1350. Links 1350 need not necessarily be the same throughout a network environment 1300. One or more first links 1350 may differ in one or more respects from one or more second links 1350.

In particular embodiments, a client system 1330 may be an electronic device including hardware, software, or embedded logic components or a combination of two or more such components and capable of carrying out the appropriate functionalities implemented or supported by a client system 1330. As an example and not by way of limitation, a client system 1330 may include a computer system such as a desktop computer, notebook or laptop computer, netbook, a tablet computer, e-book reader, GPS device, camera, personal digital assistant (PDA), handheld electronic device, cellular telephone, smartphone, virtual reality headset and controllers, other suitable electronic device, or any suitable combination thereof. This disclosure contemplates any suitable client systems 1330. A client system 1330 may enable a network user at a client system 1330 to access a network 1310. A client system 1330 may enable its user to communicate with other users at other client systems 1330. A client system 1330 may generate a virtual reality environment for a user to interact with content.

In particular embodiments, a client system 1330 may include a virtual reality (or augmented reality) headset 1332 and virtual reality input device(s) 1334, such as a virtual reality controller. A user at a client system 1330 may wear the virtual reality headset 1332 and use the virtual reality input device(s) to interact with a virtual reality environment 1336 generated by the virtual reality headset 1332. Although not shown, a client system 1330 may also include a separate processing computer and/or any other component of a virtual reality system. A virtual reality headset 1332 may generate a virtual reality environment 1336, which may include system content 1338 (including but not limited to the operating system), such as software or firmware updates and also include third-party content 1340, such as content from applications or dynamically downloaded from the Internet (e.g., web page content). A virtual reality headset 1332 may include sensor(s) 1342, such as accelerometers, gyroscopes, magnetometers to generate sensor data that tracks the location of the headset device 1332. The headset 1332 may also include eye trackers for tracking the position of the user's eyes or their viewing directions. The client system may use data from the sensor(s) 1342 to determine velocity, orientation, and gravitation forces with respect to the headset. Virtual reality input device(s) 1334 may include sensor(s) 1344, such as accelerometers, gyroscopes, magnetometers, and touch sensors to generate sensor data that tracks the location of the input device 1334 and the positions of the user's fingers. The client system 1330 may make use of outside-in tracking, in which a tracking camera (not shown) is placed external to the virtual reality headset 1332 and within the line of sight of the virtual reality headset 1332. In outside-in tracking, the tracking camera may track the location of the virtual reality headset 1332 (e.g., by tracking one or more infrared LED markers on the virtual reality headset 1332). Alternatively or additionally, the client system 1330 may make use of inside-out tracking, in which a tracking camera (not shown) may be placed on or within the virtual reality headset 1332 itself. In inside-out tracking, the tracking camera may capture images around it in the real world and may use the changing perspectives of the real world to determine its own position in space.

Third-party content 1340 may include a web browser and may have one or more add-ons, plug-ins, or other extensions. A user at a client system 1330 may enter a Uniform Resource Locator (URL) or other address directing a web browser to a particular server (such as server 1362, or a server associated with a third-party system 1370), and the web browser may generate a Hyper Text Transfer Protocol (HTTP) request and communicate the HTTP request to server. The server may accept the HTTP request and communicate to a client system 1330 one or more Hyper Text Markup Language (HTML) files responsive to the HTTP request. The client system 1330 may render a web interface (e.g. a webpage) based on the HTML files from the server for presentation to the user. This disclosure contemplates any suitable source files. As an example and not by way of limitation, a web interface may be rendered from HTML files, Extensible Hyper Text Markup Language (XHTML) files, or Extensible Markup Language (XML) files, according to particular needs. Such interfaces may also execute scripts, combinations of markup language and scripts, and the like. Herein, reference to a web interface encompasses one or more corresponding source files (which a browser may use to render the web interface) and vice versa, where appropriate.

In particular embodiments, the social-networking system 1360 may be a network-addressable computing system that can host an online social network. The social-networking system 1360 may generate, store, receive, and send social-networking data, such as, for example, user-profile data, concept-profile data, social-graph information, or other suitable data related to the online social network. The social-networking system 1360 may be accessed by the other components of network environment 1300 either directly or via a network 1310. As an example and not by way of limitation, a client system 1330 may access the social-networking system 1360 using a web browser of a third-party content 1340, or a native application associated with the social-networking system 1360 (e.g., a mobile social-networking application, a messaging application, another suitable application, or any combination thereof) either directly or via a network 1310. In particular embodiments, the social-networking system 1360 may include one or more servers 1362. Each server 1362 may be a unitary server or a distributed server spanning multiple computers or multiple datacenters. Servers 1362 may be of various types, such as, for example and without limitation, web server, news server, mail server, message server, advertising server, file server, application server, exchange server, database server, proxy server, another server suitable for performing functions or processes described herein, or any combination thereof. In particular embodiments, each server 1362 may include hardware, software, or embedded logic components or a combination of two or more such components for carrying out the appropriate functionalities implemented or supported by server 1362. In particular embodiments, the social-networking system 1360 may include one or more data stores 1364. Data stores 1364 may be used to store various types of information. In particular embodiments, the information stored in data stores 1364 may be organized according to specific data structures. In particular embodiments, each data store 1364 may be a relational, columnar, correlation, or other suitable database. Although this disclosure describes or illustrates particular types of databases, this disclosure contemplates any suitable types of databases. Particular embodiments may provide interfaces that enable a client system 1330, a social-networking system 1360, or a third-party system 1370 to manage, retrieve, modify, add, or delete, the information stored in data store 1364.

In particular embodiments, the social-networking system 1360 may store one or more social graphs in one or more data stores 1364. In particular embodiments, a social graph may include multiple nodes—which may include multiple user nodes (each corresponding to a particular user) or multiple concept nodes (each corresponding to a particular concept)—and multiple edges connecting the nodes. The social-networking system 1360 may provide users of the online social network the ability to communicate and interact with other users. In particular embodiments, users may join the online social network via the social-networking system 1360 and then add connections (e.g., relationships) to a number of other users of the social-networking system 1360 whom they want to be connected to. Herein, the term "friend" may refer to any other user of the social-networking system 1360 with whom a user has formed a connection, association, or relationship via the social-networking system 1360.

In particular embodiments, the social-networking system 1360 may provide users with the ability to take actions on various types of items or objects, supported by the social-networking system 1360. As an example and not by way of limitation, the items and objects may include groups or social networks to which users of the social-networking system 1360 may belong, events or calendar entries in which a user might be interested, computer-based applications that a user may use, transactions that allow users to buy or sell items via the service, interactions with advertisements that a user may perform, or other suitable items or objects. A user may interact with anything that is capable of being represented in the social-networking system 1360 or by an external system of a third-party system 1370, which is separate from the social-networking system 1360 and coupled to the social-networking system 1360 via a network 1310.

In particular embodiments, the social-networking system 1360 may be capable of linking a variety of entities. As an example and not by way of limitation, the social-networking system 1360 may enable users to interact with each other as well as receive content from third-party systems 1370 or other entities, or to allow users to interact with these entities through an application programming interfaces (API) or other communication channels.

In particular embodiments, a third-party system 1370 may include one or more types of servers, one or more data stores, one or more interfaces, including but not limited to APIs, one or more web services, one or more content sources, one or more networks, or any other suitable components, e.g., that servers may communicate with. A third-party system 1370 may be operated by a different entity from an entity operating the social-networking system 1360. In particular embodiments, however, the social-networking system 1360 and third-party systems 1370 may operate in conjunction with each other to provide social-networking services to users of the social-networking system 1360 or third-party systems 1370. In this sense, the social-networking system 1360 may provide a platform, or backbone, which other systems, such as third-party systems 1370, may use to provide social-networking services and functionality to users across the Internet.

In particular embodiments, a third-party system 1370 may include a third-party content object provider. A third-party content object provider may include one or more sources of content objects, which may be communicated to a client system 1330. As an example and not by way of limitation, content objects may include information regarding things or activities of interest to the user, such as, for example, movie show times, movie reviews, restaurant reviews, restaurant menus, product information and reviews, or other suitable information. As another example and not by way of limitation, content objects may include incentive content objects, such as coupons, discount tickets, gift certificates, or other suitable incentive objects.

In particular embodiments, the social-networking system 1360 also includes user-generated content objects, which may enhance a user's interactions with the social-networking system 1360. User-generated content may include anything a user can add, upload, send, or "post" to the social-networking system 1360. As an example and not by way of limitation, a user communicates posts to the social-networking system 1360 from a client system 1330. Posts may include data such as status updates or other textual data, location information, photos, videos, links, music or other similar data or media. Content may also be added to the social-networking system 1360 by a third-party through a "communication channel," such as a newsfeed or stream.

In particular embodiments, the social-networking system 1360 may include a variety of servers, sub-systems, programs, modules, logs, and data stores. In particular embodiments, the social-networking system 1360 may include one or more of the following: a web server, action logger, API-request server, relevance-and-ranking engine, content-object classifier, notification controller, action log, third-party-content-object-exposure log, inference module, authorization/privacy server, search module, advertisement-targeting module, user-interface module, user-profile store, connection store, third-party content store, or location store. The social-networking system 1360 may also include suitable components such as network interfaces, security mechanisms, load balancers, failover servers, management-and-network-operations consoles, other suitable components, or any suitable combination thereof. In particular embodiments, the social-networking system 1360 may include one or more user-profile stores for storing user profiles. A user profile may include, for example, biographic information, demographic information, behavioral information, social information, or other types of descriptive information, such as work experience, educational history, hobbies or preferences, interests, affinities, or location. Interest information may include interests related to one or more categories. Categories may be general or specific. As an example and not by way of limitation, if a user "likes" an article about a brand of shoes the category may be the brand, or the general category of "shoes" or "clothing." A connection store may be used for storing connection information about users. The connection information may indicate users who have similar or common work experience, group memberships, hobbies, educational history, or are in any way related or share common attributes. The connection information may also include user-defined connections between different users and content (both internal and external). A web server may be used for linking the social-networking system 1360 to one or more client systems 1330 or one or more third-party systems 1370 via a network 1310. The web server may include a mail server or other messaging functionality for receiving and routing messages between the social-networking system 1360 and one or more client systems 1330. An API-request server may allow a third-party system 1370 to access information from the social-networking system 1360 by calling one or more APIs. An action logger may be used to receive communications from a web server about a user's actions on or off the social-networking system 1360. In conjunction with the action log, a third-party-content-object log may be maintained of user exposures to third-party-content objects. A notification controller may provide information regarding content objects to a client system 1330. Information may be pushed to a client system 1330 as notifications, or information may be pulled from a client system 1330 responsive to a request received from a client system 1330. Authorization servers may be used to enforce one or more privacy settings of the users of the social-networking system 1360. A privacy setting of a user determines how particular information associated with a user can be shared. The authorization server may allow users to opt in to or opt out of having their actions logged by the social-networking system 1360 or shared with other systems (e.g., a third-party system 1370), such as, for example, by setting appropriate privacy settings. Third-party-content-object stores may be used to store content objects received from third parties, such as a third-party system 1370. Location stores may be used for storing location information received from client systems 1330 associated with users. Advertisement-pricing modules may combine social information, the current time, location information, or other suitable information to provide relevant advertisements, in the form of notifications, to a user.

Figure 14:
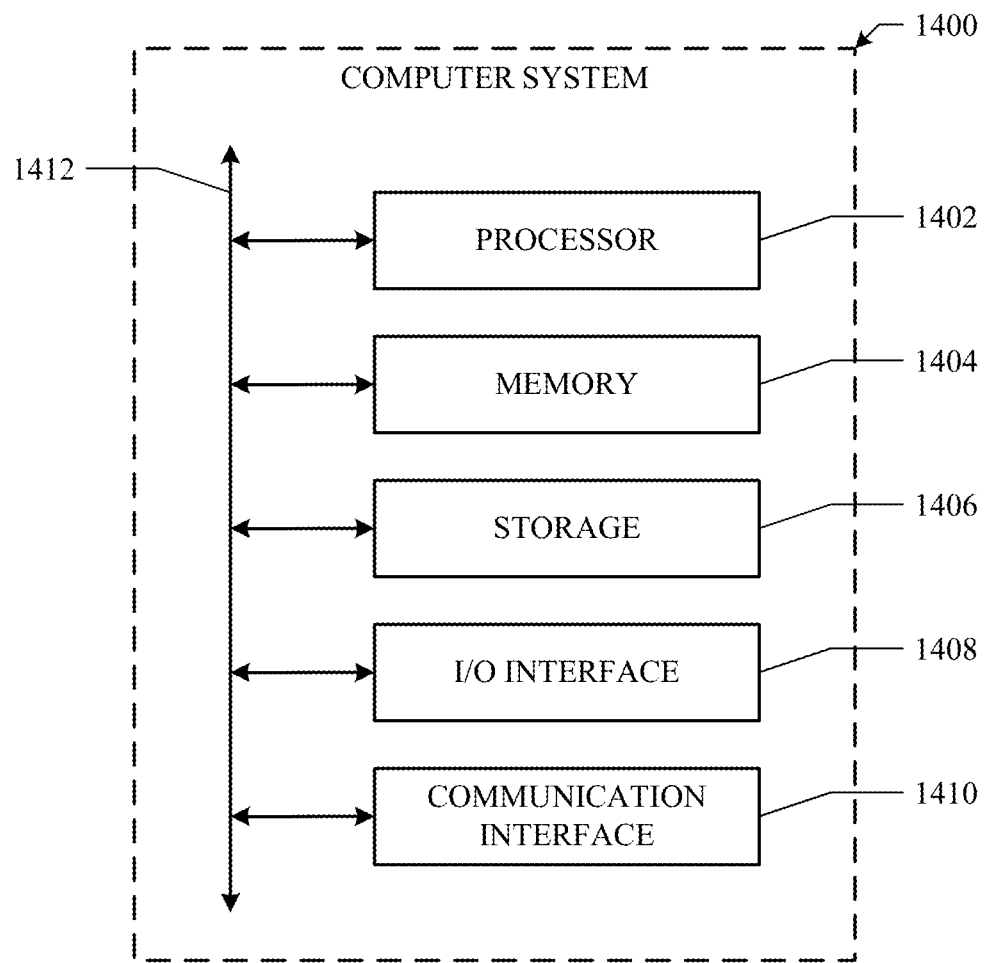
FIG. 14 illustrates an example computer system.

FIG. 14 illustrates an example computer system 1400. In particular embodiments, one or more computer systems 1400 perform one or more steps of one or more methods described or illustrated herein. In particular embodiments, one or more computer systems 1400 provide functionality described or illustrated herein. In particular embodiments, software running on one or more computer systems 1400 performs one or more steps of one or more methods described or illustrated herein or provides functionality described or illustrated herein. Particular embodiments include one or more portions of one or more computer systems 1400. Herein, reference to a computer system may encompass a computing device, and vice versa, where appropriate. Moreover, reference to a computer system may encompass one or more computer systems, where appropriate.

This disclosure contemplates any suitable number of computer systems 1400. This disclosure contemplates computer system 1400 taking any suitable physical form. As example and not by way of limitation, computer system 1400 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 1400 may include one or more computer systems 1400; be unitary or distributed; span multiple locations; span multiple machines; span multiple data centers; or reside in a cloud, which may include one or more cloud components in one or more networks. Where appropriate, one or more computer systems 1400 may perform without substantial spatial or temporal limitation one or more steps of one or more methods described or illustrated herein. As an example and not by way of limitation, one or more computer systems 1400 may perform in real time or in batch mode one or more steps of one or more methods described or illustrated herein. One or more computer systems 1400 may perform at different times or at different locations one or more steps of one or more methods described or illustrated herein, where appropriate.

In particular embodiments, computer system 1400 includes a processor 1402, memory 1404, storage 1406, an input/output (I/O) interface 1408, a communication interface 1410, and a bus 1412. Although this disclosure describes and illustrates a particular computer system having a particular number of particular components in a particular arrangement, this disclosure contemplates any suitable computer system having any suitable number of any suitable components in any suitable arrangement.

In particular embodiments, processor 1402 includes hardware for executing instructions, such as those making up a computer program. As an example and not by way of limitation, to execute instructions, processor 1402 may retrieve (or fetch) the instructions from an internal register, an internal cache, memory 1404, or storage 1406; decode and execute them; and then write one or more results to an internal register, an internal cache, memory 1404, or storage 1406. In particular embodiments, processor 1402 may include one or more internal caches for data, instructions, or addresses. This disclosure contemplates processor 1402 including any suitable number of any suitable internal caches, where appropriate. As an example and not by way of limitation, processor 1402 may include one or more instruction caches, one or more data caches, and one or more translation lookaside buffers (TLBs). Instructions in the instruction caches may be copies of instructions in memory 1404 or storage 1406, and the instruction caches may speed up retrieval of those instructions by processor 1402. Data in the data caches may be copies of data in memory 1404 or storage 1406 for instructions executing at processor 1402 to operate on; the results of previous instructions executed at processor 1402 for access by subsequent instructions executing at processor 1402 or for writing to memory 1404 or storage 1406; or other suitable data. The data caches may speed up read or write operations by processor 1402. The TLBs may speed up virtual-address translation for processor 1402. In particular embodiments, processor 1402 may include one or more internal registers for data, instructions, or addresses. This disclosure contemplates processor 1402 including any suitable number of any suitable internal registers, where appropriate. Where appropriate, processor 1402 may include one or more arithmetic logic units (ALUs); be a multi-core processor; or include one or more processors 1402. Although this disclosure describes and illustrates a particular processor, this disclosure contemplates any suitable processor.

In particular embodiments, memory 1404 includes main memory for storing instructions for processor 1402 to execute or data for processor 1402 to operate on. As an example and not by way of limitation, computer system 1400 may load instructions from storage 1406 or another source (such as, for example, another computer system 1400) to memory 1404. Processor 1402 may then load the instructions from memory 1404 to an internal register or internal cache. To execute the instructions, processor 1402 may retrieve the instructions from the internal register or internal cache and decode them. During or after execution of the instructions, processor 1402 may write one or more results (which may be intermediate or final results) to the internal register or internal cache. Processor 1402 may then write one or more of those results to memory 1404. In particular embodiments, processor 1402 executes only instructions in one or more internal registers or internal caches or in memory 1404 (as opposed to storage 1406 or elsewhere) and operates only on data in one or more internal registers or internal caches or in memory 1404 (as opposed to storage 1406 or elsewhere). One or more memory buses (which may each include an address bus and a data bus) may couple processor 1402 to memory 1404. Bus 1412 may include one or more memory buses, as described below. In particular embodiments, one or more memory management units (MMUs) reside between processor 1402 and memory 1404 and facilitate accesses to memory 1404 requested by processor 1402. In particular embodiments, memory 1404 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 1404 may include one or more memories 1404, where appropriate. Although this disclosure describes and illustrates particular memory, this disclosure contemplates any suitable memory.

In particular embodiments, storage 1406 includes mass storage for data or instructions. As an example and not by way of limitation, storage 1406 may include a hard disk drive (HDD), a floppy disk drive, flash memory, an optical disc, a magneto-optical disc, magnetic tape, or a Universal Serial Bus (USB) drive or a combination of two or more of these. Storage 1406 may include removable or non-removable (or fixed) media, where appropriate. Storage 1406 may be internal or external to computer system 1400, where appropriate. In particular embodiments, storage 1406 is non-volatile, solid-state memory. In particular embodiments, storage 1406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 1406 taking any suitable physical form. Storage 1406 may include one or more storage control units facilitating communication between processor 1402 and storage 1406, where appropriate. Where appropriate, storage 1406 may include one or more storages 1406. Although this disclosure describes and illustrates particular storage, this disclosure contemplates any suitable storage.

In particular embodiments, I/O interface 1408 includes hardware, software, or both, providing one or more interfaces for communication between computer system 1400 and one or more I/O devices. Computer system 1400 may include one or more of these I/O devices, where appropriate. One or more of these I/O devices may enable communication between a person and computer system 1400. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 1408 for them. Where appropriate, I/O interface 1408 may include one or more device or software drivers enabling processor 1402 to drive one or more of these I/O devices. I/O interface 1408 may include one or more I/O interfaces 1408, where appropriate. Although this disclosure describes and illustrates a particular I/O interface, this disclosure contemplates any suitable I/O interface.

In particular embodiments, communication interface 1410 includes hardware, software, or both providing one or more interfaces for communication (such as, for example, packet-based communication) between computer system 1400 and one or more other computer systems 1400 or one or more networks. As an example and not by way of limitation, communication interface 1410 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 1410 for it. As an example and not by way of limitation, computer system 1400 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 1400 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 1400 may include any suitable communication interface 1410 for any of these networks, where appropriate. Communication interface 1410 may include one or more communication interfaces 1410, where appropriate. Although this disclosure describes and illustrates a particular communication interface, this disclosure contemplates any suitable communication interface.

In particular embodiments, bus 1412 includes hardware, software, or both coupling components of computer system 1400 to each other. As an example and not by way of limitation, bus 1412 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 1412 may include one or more buses 1412, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing systems:
   receiving a video comprising a sequence of frames;
   accessing a three-dimensional mask that specifies pixel-sampling locations, the three-dimensional mask having (1) a first dimension and a second dimension corresponding to a spatial domain and (2) a third dimension corresponding to a temporal domain, wherein a blue noise property is present in:
      the pixel-sampling locations that are associated with each of a plurality of two-dimensional spatial slices of the three-dimensional mask in the spatial domain; and
      the pixel-sampling locations that are associated with each of a plurality of one-dimensional temporal slices of the three-dimensional mask in the temporal domain;
   generating a sample of the video by sampling the sequence of frames using the three-dimensional mask; and
   generating a reconstructed video from the generated sample of the video using a machine-learning model.

2. The method of claim 1, wherein the three-dimensional mask is generated by selecting the pixel-sampling locations using a distance function, wherein the distance function measures a distance between any two pixel-sampling locations in the three-dimensional mask based on a Euclidean distance in the spatial domain and a Manhattan distance in the temporal domain.

3. The method of claim 2, wherein the pixel-sampling locations specified by the three-dimensional mask are sequentially selected, wherein at least one of the pixel-sampling locations is selected based on distances, measured using the distance function, between that pixel-sampling location and previously selected pixel-sampling locations.

4. The method of claim 1, wherein the pixel-sampling locations in the three-dimensional mask are associated with sequential values corresponding to a sequence in which the pixel-sampling locations are selected.

5. The method of claim 4, further comprising:
determining a threshold value corresponding to a desired percentage of the pixel-sampling locations to be used for generating the sample of the video; and
selecting a subset of the pixel-sampling locations based on the threshold value and the sequential values associated with the pixel-sampling locations;
wherein the sample of the video is generated by sampling the sequence of frames according to the subset of the pixel-sampling locations.

6. The method of claim 1, wherein the sample of the video has incomplete pixel information and the reconstructed video has complete pixel information.

7. The method of claim 1, further comprising:
transmitting the sample of the video to a second computing system to reconstruct the video at the second computing system.

8. One or more computer-readable non-transitory storage media embodying software that is operable when executed to:
receive a video comprising a sequence of frames;
access a three-dimensional mask that specifies pixel-sampling locations, the three-dimensional mask having (1) a first dimension and a second dimension corresponding to a spatial domain and (2) a third dimension corresponding to a temporal domain, wherein a blue noise property is present in:
the pixel-sampling locations that are associated with each of a plurality of two-dimensional spatial slices of the three-dimensional mask in the spatial domain; and
the pixel-sampling locations that are associated with each of a plurality of one-dimensional temporal slices of the three-dimensional mask in the temporal domain;
generate a sample of the video by sampling the sequence of frames using the three-dimensional mask; and
generate a reconstructed video from the generated sample of the video using a machine-learning model.

9. The media of claim 8, wherein the three-dimensional mask is generated by selecting the pixel-sampling locations using a distance function, wherein the distance function measures a distance between any two pixel-sampling locations in the three-dimensional mask based on a Euclidean distance in the spatial domain and a Manhattan distance in the temporal domain.

10. The media of claim 9, wherein the pixel-sampling locations specified by the three-dimensional mask are sequentially selected, wherein at least one of the pixel-sampling locations is selected based on distances, measured using the distance function, between that pixel-sampling location and previously selected pixel-sampling locations.

11. The media of claim 8, wherein the pixel-sampling locations in the three-dimensional mask are associated with sequential values corresponding to a sequence in which the pixel-sampling locations are selected.

12. The media of claim 11, wherein the software is further operable when executed to:
determine a threshold value corresponding to a desired percentage of the pixel-sampling locations to be used for generating the sample of the video; and
select a subset of the pixel-sampling locations based on the threshold value and the sequential values associated with the pixel-sampling locations;
wherein the sample of the video is generated by sampling the sequence of frames according to the subset of the pixel-sampling locations.

13. The media of claim 8, wherein the sample of the video has incomplete pixel information and the reconstructed video has complete pixel information.

14. The media of claim 8, wherein the software is further operable when executed to:
transmit the sample of the video to a second computing system to reconstruct the video at the second computing system.

15. A system comprising:
one or more processors; and
one or more computer-readable non-transitory storage media coupled to one or more of the processors and comprising instructions operable when executed by one or more of the processors to cause the system to:
receive a video comprising a sequence of frames;
access a three-dimensional mask that specifies pixel-sampling locations, the three-dimensional mask having (1) a first dimension and a second dimension corresponding to a spatial domain and (2) a third dimension corresponding to a temporal domain, wherein a blue noise property is present in:
the pixel-sampling locations that are associated with each of a plurality of two-dimensional spatial slices of the three-dimensional mask in the spatial domain; and
the pixel-sampling locations that are associated with each of a plurality of one-dimensional temporal slices of the three-dimensional mask in the temporal domain;
generate a sample of the video by sampling the sequence of frames using the three-dimensional mask; and
generate a reconstructed video from the generated sample of the video using a machine-learning model.

16. The system of claim 15, wherein the three-dimensional mask is generated by selecting the pixel-sampling locations using a distance function, wherein the distance function measures a distance between any two pixel-sampling locations in the three-dimensional mask based on a Euclidean distance in the spatial domain and a Manhattan distance in the temporal domain.

17. The system of claim 16, wherein the pixel-sampling locations specified by the three-dimensional mask are sequentially selected, wherein at least one of the pixel-sampling locations is selected based on distances, measured using the distance function, between that pixel-sampling location and previously selected pixel-sampling locations.

18. The system of claim 15, wherein the pixel-sampling locations in the three-dimensional mask are associated with sequential values corresponding to a sequence in which the pixel-sampling locations are selected.

19. The system of claim 18, wherein the processors are further operable when executing the instructions to:

determine a threshold value corresponding to a desired percentage of the pixel-sampling locations to be used for generating the sample of the video; and select a subset of the pixel-sampling locations based on the threshold value and the sequential values associated with the pixel-sampling locations;

wherein the sample of the video is generated by sampling the sequence of frames according to the subset of the pixel-sampling locations.

20. The system of claim 15, wherein the processors are further operable when executing the instructions to:

transmit the sample of the video to a second computing system to reconstruct the video at the second computing system.

\* \* \* \* \*